(12) United States Patent
Bogie et al.

(10) Patent No.: US 12,465,751 B2
(45) Date of Patent: Nov. 11, 2025

(54) FLEXIBLE NONMETALLIC ELECTRODE

(71) Applicants: United States Government as Represented by the Department of Veterans Affairs, Washington, DC (US); CASE WESTERN RESERVE UNIVERSITY, Cleveland, OH (US)

(72) Inventors: Kath M. Bogie, Cleveland, OH (US); Dhruv Seshadri, Cleveland, OH (US); Medha Srigiri, Cleveland, OH (US); Christian A. Zorman, Euclid, OH (US)

(73) Assignees: United States Government as represented by the Department of Veterans Affairs, Washington, DC (US); Case Western Reserve University, Cleveland, OH (US)

( * ) Notice: Subject to any disclaimer, the term of this patent is extended or adjusted under 35 U.S.C. 154(b) by 499 days.

(21) Appl. No.: 17/917,452

(22) PCT Filed: Apr. 9, 2021

(86) PCT No.: PCT/US2021/026571
§ 371 (c)(1),
(2) Date: Oct. 6, 2022

(87) PCT Pub. No.: WO2021/207594
PCT Pub. Date: Oct. 14, 2021

(65) Prior Publication Data
US 2023/0158293 A1    May 25, 2023

Related U.S. Application Data

(60) Provisional application No. 63/007,596, filed on Apr. 9, 2020.

(51) Int. Cl.
*A61N 1/04* (2006.01)
*A61B 5/0531* (2021.01)
(Continued)

(52) U.S. Cl.
CPC .......... *A61N 1/0468* (2013.01); *A61B 5/0531* (2013.01); *A61F 13/05* (2024.01); *H01B 1/24* (2013.01)

(58) Field of Classification Search
CPC .. A61N 1/0468; A61N 1/0472; A61N 1/0496; A61F 13/05; A61B 5/0531; A61B 5/0535
(Continued)

(56) References Cited

U.S. PATENT DOCUMENTS

2007/0060815 A1    3/2007  Martin et al.
2011/0257504 A1*  10/2011  Hendricks ................ A61N 1/05
                                                    607/45
(Continued)

OTHER PUBLICATIONS

Chong et al., "Vascular Pressure-Flow Measurement Using CB-PDMS Flexible Strain Sensor," IEEE Transactions on Biomedical Circuits and Systems, vol. 13, No. 6, Dec. 2019. (Year: 2019).*
(Continued)

*Primary Examiner* — Ahmed M Farah
(74) *Attorney, Agent, or Firm* — Ballard Spahr LLP

(57) ABSTRACT

An electrode can comprise carbon black and one of polydimethylsiloxane (PDMS) or PVA, wherein the carbon black has a weight of between 10% and 50% of a weight of the PDMS or PVA. The electrode can be suitable for bioelectronics. A pattern of hydrogel can be deposited on the electrode for providing adhesion to a subject. The electrode can be used in wound treatment and/or monitoring devices or in various other bioelectronics applications.

18 Claims, 29 Drawing Sheets

(51) Int. Cl.
*A61F 13/05* (2024.01)
*H01B 1/24* (2006.01)

(58) Field of Classification Search
USPC .......................................................... 607/50
See application file for complete search history.

(56) References Cited

U.S. PATENT DOCUMENTS

| 2015/0369771 | A1 | 12/2015 | Richardson-Burns et al. | |
| 2016/0079631 | A1* | 3/2016 | Flitsch | H01M 4/06 29/623.2 |
| 2016/0164099 | A1* | 6/2016 | Wang | H01M 10/052 252/511 |
| 2018/0133457 | A1* | 5/2018 | Yao | A61B 5/24 |
| 2019/0341165 | A1* | 11/2019 | Al-Harthi | C08J 3/215 |
| 2020/0316366 | A1* | 10/2020 | Wang | A61F 13/0273 |

OTHER PUBLICATIONS

Chong Hao et al: "Vascular Pressure-Flow Measurement Using CB-PDMS Flexible Strain Sensor", IEEE Transactions on Biomedical Circuits and Systems, IEEE, US, vol. 13, No. 6, Dec. 1, 2019 (Dec. 1, 2019), pp. 1451-1461, XP011763628, ISSN: 1932-4545, DOI: 10.1109/TBCAS.2019.2946519 [retrieved on Jan. 1, 2020].
Pedro Alhais Lopes et al: "Soft Bioelectronic Stickers: Selection and Evaluation of Skin-Interfacing Electrodes", Advanced Healthcare Materials, Wiley—V C H Verlag Gmbh & Co. KGAA, DE, vol. 8, No. 15, Jul. 5, 2019 (Jul. 5, 2019), p. n/a, XP072468784, ISSN: 2192-2640, DOI: 10.1002/ADHM.201900234.
International Search Report and Written Opinion for PCT/US2021/026571, dated Jul. 20, 2021.
Extended European Search Report for EP21 783 987.7 dated May 13, 2024.

* cited by examiner

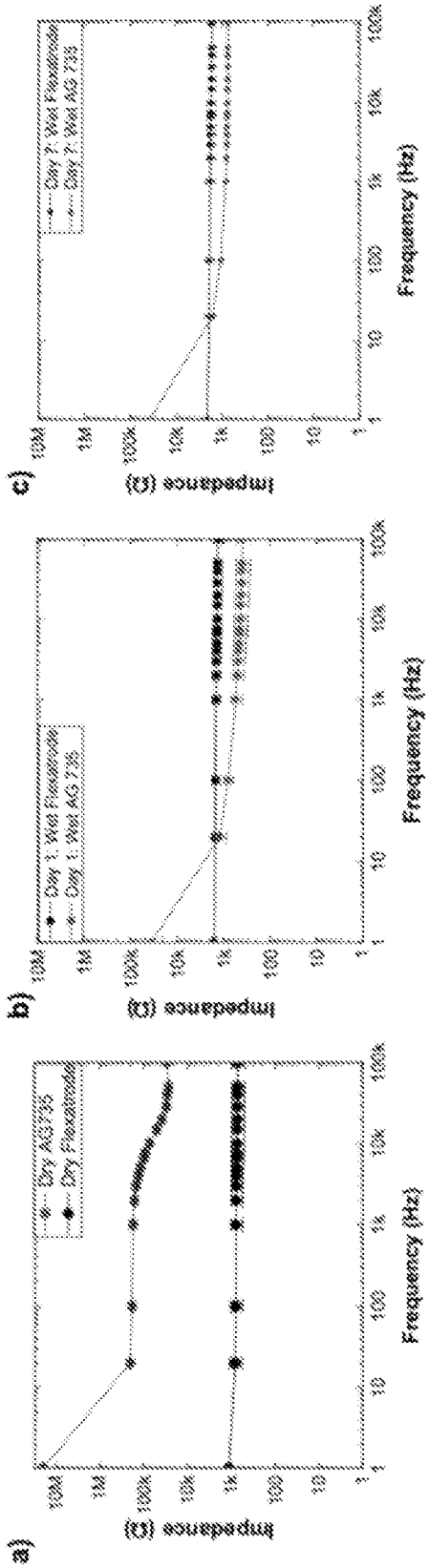
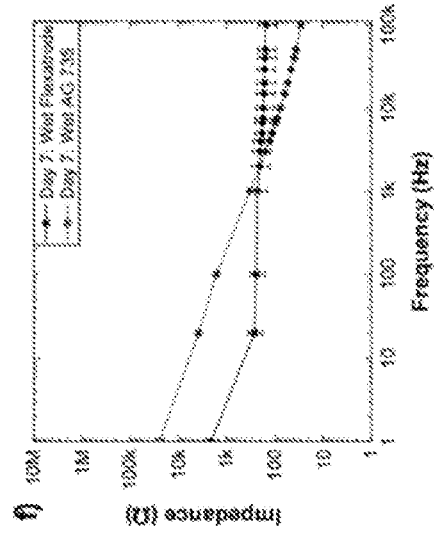
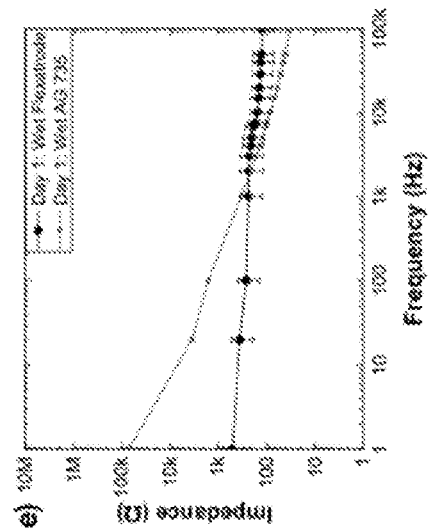
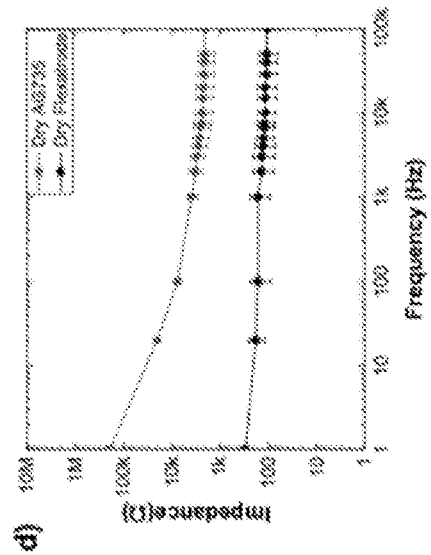
FIG. 12A FIG. 12B FIG. 12C
FIG. 12D FIG. 12E FIG. 12F

FLEXIBLE NONMETALLIC ELECTRODE

CROSS-REFERENCE TO RELATED APPLICATION

This application is a national phase filing under 35 U.S.C. § 371 of International Application No. PCT/US2021/026571, filed Apr. 9, 2021, which claims priority to, and the benefit of the filing date of U.S. Provisional Patent Application No. 63/007,596, filed Apr. 9, 2020. The entirety of each of these applications is hereby incorporated by reference herein.

FIELD

This application relates to flexible electrodes and, in particular, to flexible nonmetallic electrodes for use in wearable bioelectronics.

BACKGROUND

Gel-based Ag/AgCl electrodes are conventionally used for medical electrode technologies due to their adhesion to the stratum corneum and conductivity needed to measure physiological signals. However, some limitations of gel-based Ag/AgCl electrodes include skin irritation (e.g., non-specific cathodal vasodilation and/or erythema), bacterial growth (especially when long-term monitoring/treatment is required, gel dehydration over time), and signal degradation due to the formation of eccrine sweat (e.g., high Signal-to-Noise Ratio (SNR)). Approximately 10% of gel-based Ag/AgCl electrode users suffer from some degree of erythema and/or redness.

SUMMARY

Disclosed herein, in one aspect, is an electrode comprising carbon black and a polymer (e.g., polyvinyl alcohol (PVA) or polydimethylsiloxane (PDMS)), wherein the carbon black has a weight of between 10% and 50% of a weight of the polymer.

A method can comprise placing an electrode assembly on a patient.

A method of making an electrode can comprise depositing a mixture of carbon black, polymer (e.g., PDMS or PVA), and solvent in a mold.

The method can further comprise: mixing a first mixture comprising a PDMS base, a PDMS curing agent, and solvent; mixing a second mixture comprising carbon black and solvent; and mixing the first mixture with the second mixture to provide the mixture of carbon black, PDMS, and solvent.

Mixing the second mixture comprising carbon black and solvent can comprise using a sonicator.

The method can further comprise thermally curing the mixture within the mold.

The solvent can comprise toluene or water.

The method can further comprise depositing a layer of hydrogel over only a portion of a surface of the electrode.

Depositing the layer of hydrogel over only the portion of the surface of the electrode can comprise placing a mask over the surface of the electrode. The mask can comprise at least one cut-out that defines a coverage area.

Additional advantages of the disclosed system and method will be set forth in part in the description which follows, and in part will be understood from the description, or may be learned by practice of the disclosed system and method. The advantages of the disclosed system and method will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the disclosed apparatus, system, and method and together with the description, serve to explain the principles of the disclosed apparatus, system, and method.

FIG. 12A illustrates impedance as a function of frequency for a dry conventional hydrogel electrode and a dry carbon black-PDMS electrode. FIG. 12B illustrates impedance as a function of frequency for a conventional hydrogel electrode and a carbon black-PDMS electrode that have each been wet for one day. FIG. 12C illustrates impedance as a function of frequency for a conventional hydrogel electrode and a carbon black-PDMS electrode that have each been wet for seven days. FIG. 12D illustrates impedance as a function of frequency for a dry conventional hydrogel electrode and a dry carbon black-PDMS electrode. FIG. 12E illustrates impedance as a function of frequency for a conventional hydrogel electrode and a carbon black-PDMS electrode that have each been wet for one day. FIG. 12F illustrates impedance as a function of frequency for a conventional hydrogel electrode and a carbon black-PDMS electrode that have each been wet for seven days.

DETAILED DESCRIPTION

Figures 1A, 1B:
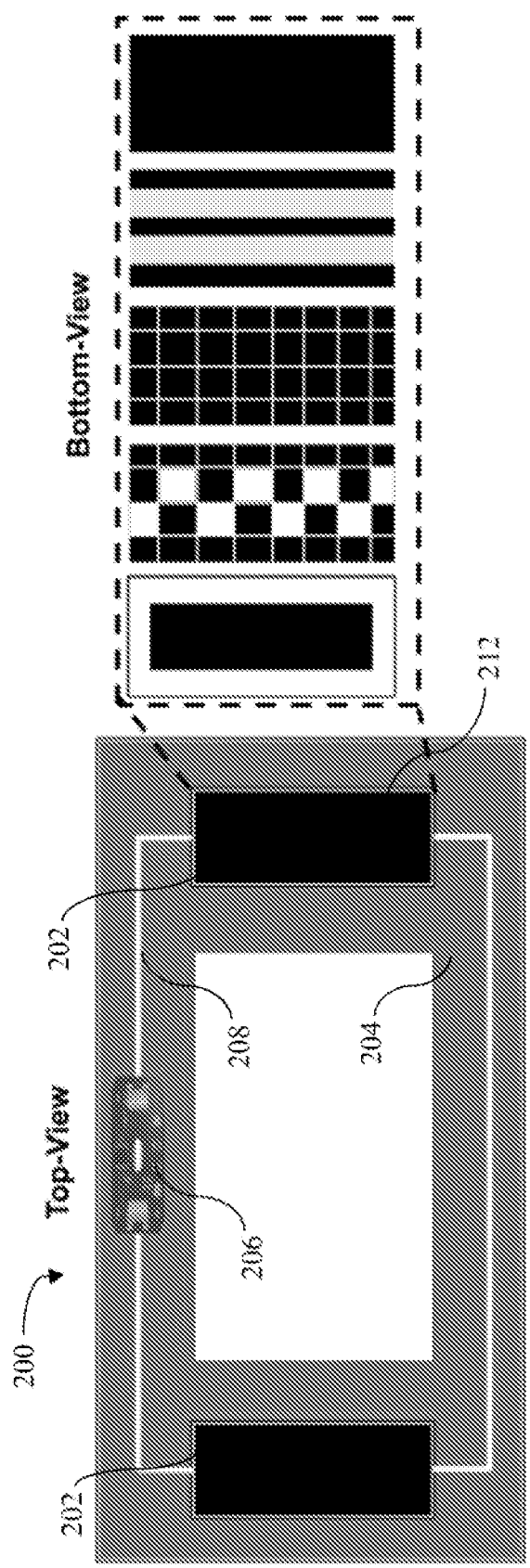
FIG. 1A is a top view of an electrode assembly comprising a flexible nonmetallic electrode, in accordance with embodiments disclosed herein.
FIG. 1B is a close-up bottom view of exemplary electrode configurations.

The disclosed system and method may be understood more readily by reference to the following detailed description of particular embodiments and the examples included therein and to the Figures and their previous and following description.

It is to be understood that the terminology used herein is for the purpose of describing particular embodiments only and is not intended to limit the scope of the present invention which will be limited only by the appended claims.

It must be noted that as used herein and in the appended claims, the singular forms "a," "an," and "the" include plural references unless the context clearly dictates otherwise. Thus, for example, reference to "an electrode" includes one or more of such electrodes, and so forth.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values or characteristics are approximated by use of the antecedents "about," "substantially," or "generally," it is contemplated that values within up to 15%, up to 10%, up to 5%, or up to 1% (above or below) of the particularly stated value or characteristic can be included within the scope of those aspects.

Unless defined otherwise, all technical and scientific terms used herein have the same meanings as commonly understood by one of skill in the art to which the disclosed apparatus, system, and method belong. Although any apparatus, systems, and methods and materials similar or equivalent to those described herein can be used in the practice or testing of the present apparatus, system, and method, the particularly useful methods, devices, systems, and materials are as described.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step.

As used herein, the term "via" refers to a vertical interconnect access (VIA) structure or component as is known in the art.

As used in this application, the terms "the device" and "ISSD" are used interchangeably.

As used herein, "weight percent" refers to a ratio or proportion of carbon black to polymer (e.g., PDMS or PVA), and can be understood as a weight/mass of the carbon black as a percentage of a weight/mass of the polymer (i.e., a ratio of the weight or mass of the carbon black to the weight or mass of the polymer, expressed as a percentage). Thus, for example, one gram of carbon black combined with ten grams of PDMS can have a carbon black weight percent of 10%.

Disclosed herein, in various aspects and with reference to FIGS. 1A-1B is an electrode assembly 200 comprising one or more electrodes 202 (two shown in FIG. 1A). Although one embodiment of an electrode assembly 200 is provided in detail herein, it should be understood that the electrodes disclosed herein can be used in a wide range of applications and, therefore, the electrode assembly can be adapted and configured for any given application. Thus, this disclosure should in no way limit the applications, assemblies, and systems for which the electrode 202 can be used.

Carbon Black-PDMS Electrodes

In exemplary aspects, at least one (optionally, each) of the electrodes 202 can comprise carbon black and polydimethylsiloxane (PDMS). In various optional aspects, it is contemplated that the electrodes can consist of, or consist substantially of, PDMS and carbon black. It can be understood that dry electrodes can create at least two prominent difficulties. First, adhesion of the dry electrode to the stratum corneum (i.e., the outer layer of the skin) with or without the presence of eccrine or apocrine sweat can be difficult. Second, sufficient conductivity of the electrode can be difficult to obtain, particularly in comparison to conventional gel-based electrodes. Embodiments herein can address these prominent deficiencies.

In some aspects, the electrodes 202 can be formed by molding a slurry comprising a solvent (e.g., toluene or 2-propanol or n-hexane), carbon black, and PDMS. The fabrication process makes itself amenable to a wide array of conductive fillers such as: Carbon nanotubes, silver nanowires, metal particles, eutectic gallium-indium alloy and/or graphite flakes. Thus, it is contemplated that in further aspects, any of the above or like conductive fillers, or a mixture thereof, can be used in addition to, or as a partial or complete substitution for, the carbon black. The slurry can be poured into a mold (or mixed within the mold) and allowed to cure. Optionally, the slurry can be thermally cured, for example, by placing the mold in an oven.

In some aspects, the electrode 202 can have an optimal weight of 10-25% carbon black relative to the weight of the PDMS (i.e., the weight/mass of carbon black is 10-25% of the weight/mass of the PDMS, corresponding to a "weight percent" of 10-25%). It is contemplated that, when mixed with PDMS, a weight percent sufficiently above 25% carbon black (i.e., a weight/mass of carbon black that is greater than 25% of the weight/mass of the PDMS) can produce a brittle electrode that can have insufficient elongation characteristics and insufficient crack and stress resistance. It is further contemplated that a weight percent below 5% or below 10% (i.e., a weight/mass of carbon black that is less than 5% or less than 10% of the weight/mass of PDMS) can have a sub-optimal conductivity that can inhibit functionality of the electrode. In further aspects, the electrode 202 can have a weight percent of carbon black (corresponding to a ratio of the weight of carbon black to the weight of PDMS in the electrode, expressed as a percentage) of between 5% and 30%, between 10% and 30%, between 10% and 25%, between 15% and 25%, between 20% and 30%, between 15% and 25%, between 20% and 25%, between 25% and 30%, or about 10%, or about 14%, or about 15%, or about 18%, or about 20%, or about 22%, or about 25%. In some aspects, the weight percent of carbon black to PDMS can be selected based on the amount of flexion required for a desired application.

The PDMS can optionally be Sylgard-184 (DOW CHEMICAL COMPANY) and can be produced upon mixing a base component and a curing agent using conventional methods. In further optional aspects, any silicon variant (silicon-based elastomer) with a base and curing agent can be used, such as, for example, Ecoflex-10 elastomer (SMOOTH-ON, INC.) or MED-4210 elastomer (NUSIL TECHNOLOGY). The desired mechanical properties (e.g., stretchability and flexibility) can be tailored based on material selection and composition.

Table 1, which is provided below, shows component quantities for exemplary embodiments of composition mixtures for producing electrodes of various weight percentages as further disclosed herein. It is contemplated that a greater weight percentage of carbon black can beneficially be dissolved in a relatively larger quantity of solvent. Optionally, the increase in carbon black (by weight percentage) can be proportional or substantially proportional to the increase in the volume of solvent.

TABLE 1

| CB-PDMS (%) | Carbon Black (g) | PDMS Base Component (g) | PDMS Curing Agent (g) | Toluene (mL) (solvent) |
|---|---|---|---|---|
| 10% CB-PDMS | 0.4 | 3.64 | 0.36 | 9.62 |
| 14% CB-PDMS | 0.56 | 3.64 | 0.36 | 13.46 |
| 18% CB-PDMS | 0.72 | 3.64 | 0.36 | 17.31 |
| 25% CB-PDMS | 1.0 | 3.64 | 0.36 | 24.04 |

In some aspects, a PDMS base component and a PDMS curing agent can be mixed in a first vessel with a portion (e.g., about half) of the solvent to create a first mixture. The first mixture can be stirred for about thirty minutes with a magnetic stirrer.

A second mixture can comprise a remaining portion of the solvent and carbon black. The second mixture can be mixed to create a first slurry. For example, a sonicator (e.g., a Qsonica Q500 probe) at 500 W, 20 kHz, 30% duty cycle can be used to mix the solvent/carbon black slurry for approximately thirty minutes. The first mixture of PDMS can be added to the first slurry to create a second slurry. The second slurry can be mixed (e.g., stirred with a magnetic stir bar for about ten minutes).

Figure 5:
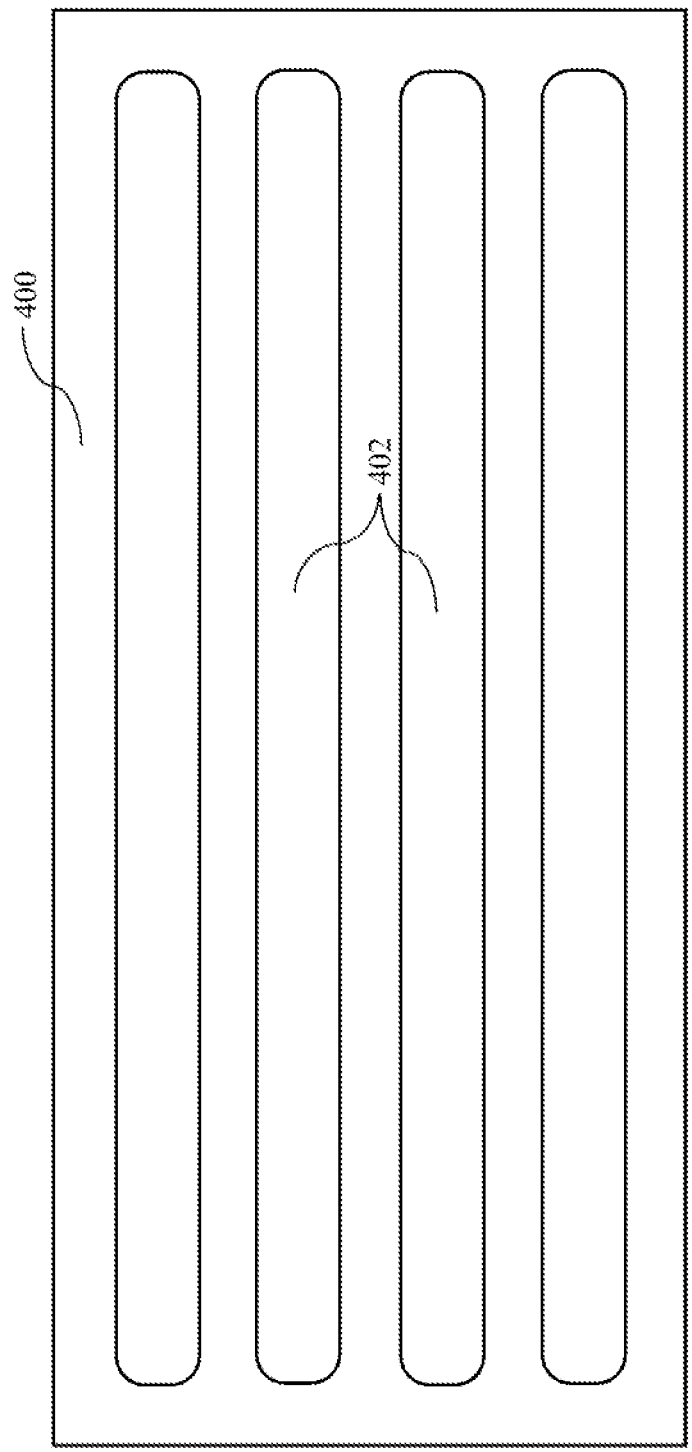
FIG. 5 is a top view of an exemplary mold for forming the flexible nonmetallic electrodes of FIG. 1.

Referring to FIG. 5, the second slurry can be provided in a mold. The mold can optionally comprise poly(tetrafluoroethylene) (PTFE). In some optional aspects, a single mold body 400 can define a plurality of (e.g., four) molds 402 (e.g., continuous troughs). Each mold (e.g., trough) can optionally have dimensions of 160 cm long by 10 cm wide by 0.25 cm deep or 160 cm long by 10 cm wide by 0.35 cm deep. However, any suitable dimensions can be used. For example, it is contemplated that each mold 402 can have a length dimension ranging from 100 cm to 200 cm, a width dimension ranging from 5 cm to 15 cm, and a depth dimension ranging from 0.10 cm to 0.50 cm. The second slurry can be cured in the mold. For example, the second slurry can be cured at about eighty degrees for about five hours. The second slurry can optionally be cured in a vacuum oven.

Once cured, the electrode can be removed from the mold. The electrode can further be cut to a desired size and shape.

Although the electrode dimensions can be tailored for any given application, it is contemplated that rectangular shapes can be preferable due to the conductive pathways created by the carbon black particles. In some optional aspects, the electrode can be one centimeter wide and four centimeters long. In other optional aspects, the electrode can have a width ranging from 0.25 cm to 4 cm or from 0.5 cm to 2 cm, and the electrode can have a length ranging from 1 cm to 10 cm or from 2 cm to 6 cm. The thickness can be selected to provide a flexibility sufficient to conform to the irregular topography of the stratum corneum. For example, in some optional aspects, the electrode can have a thickness of about 0.3 mm. In further aspects, the thickness of the electrode can be any thickness selected based on the application, including, but not limited to, between 0.25 mm and 0.5 mm, between 0.5 mm and 1 mm, between 1 mm and 2 mm, between 2 mm and 5 mm, or between 0.25 mm and 5 mm.

Figure 6A:
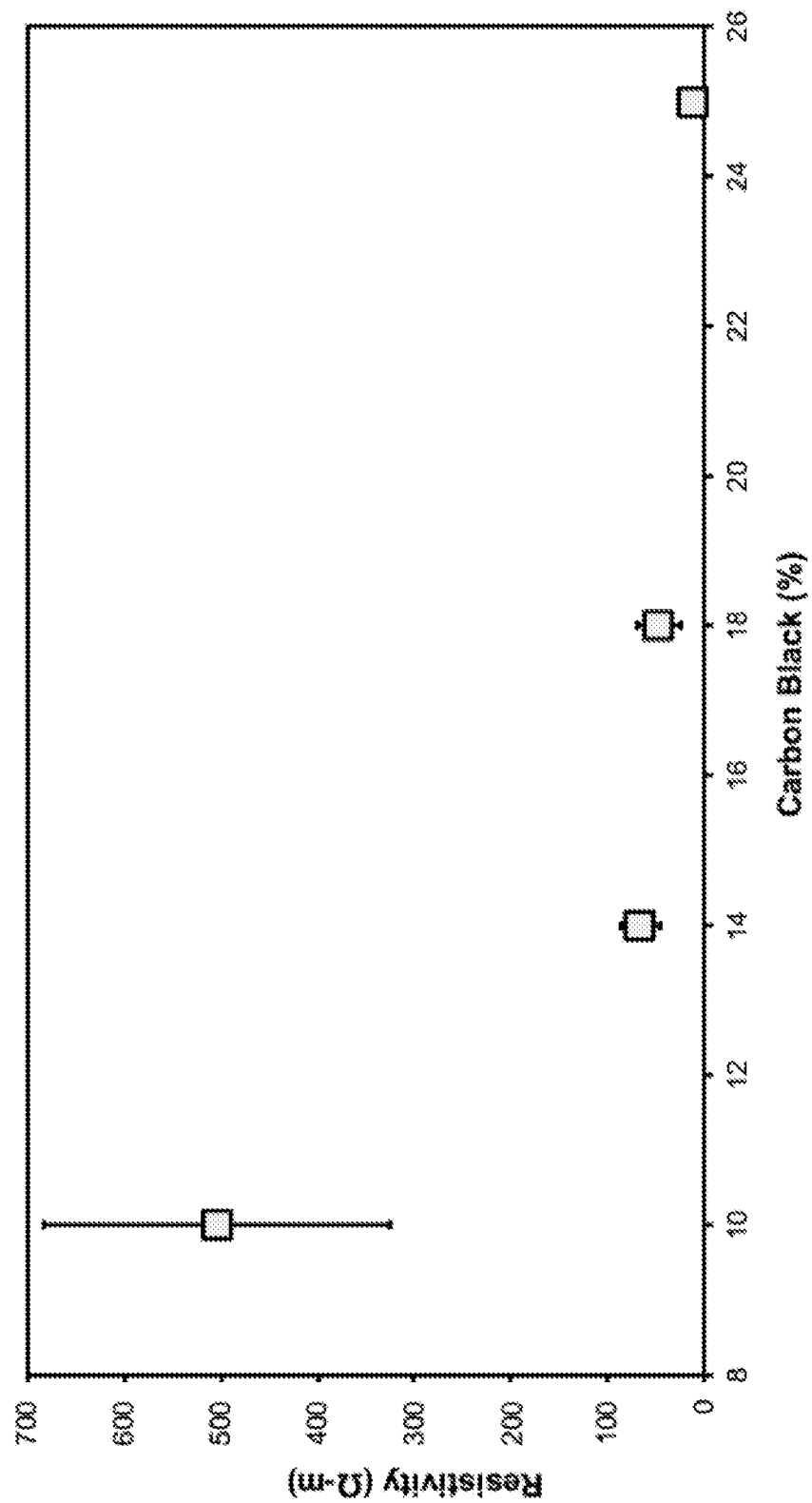
FIG. 6A illustrates empirical resistivities of exemplary electrodes of various carbon black percentages.
Figure 6B:
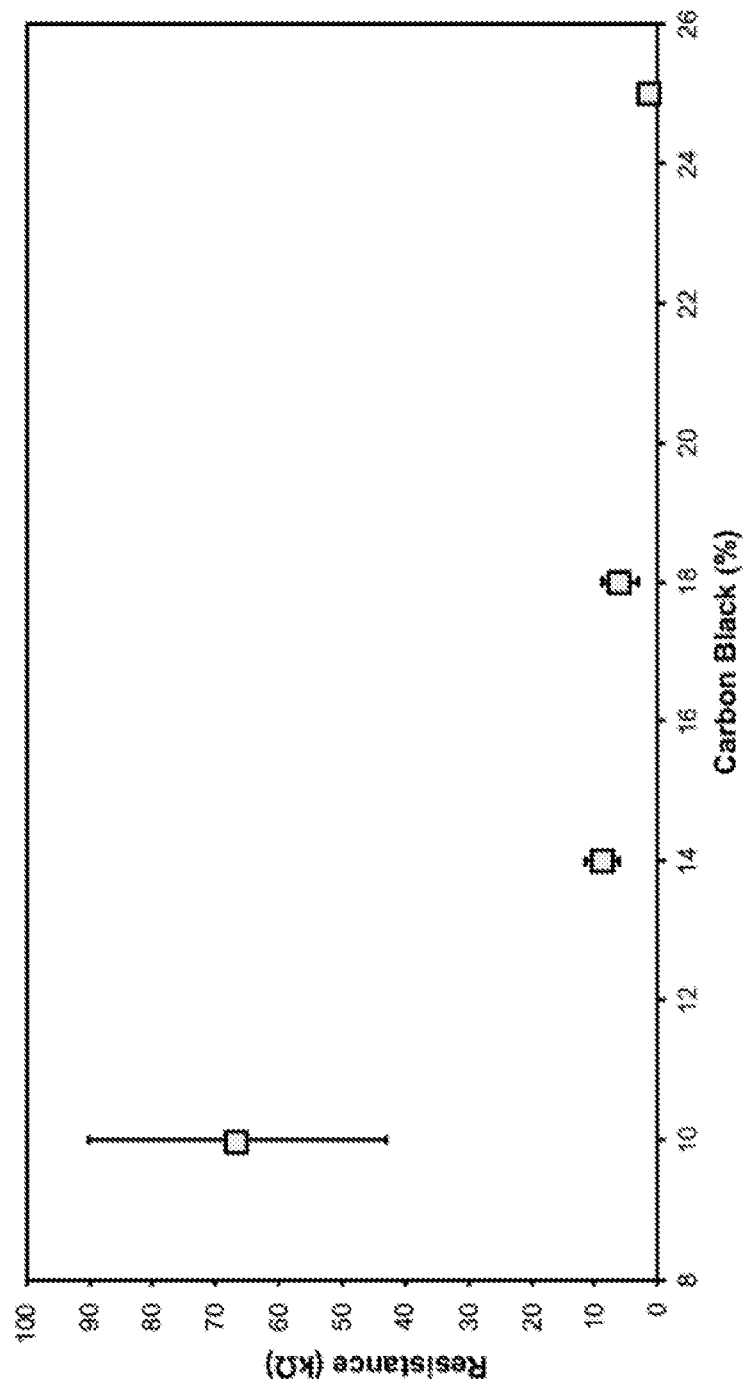
FIG. 6B illustrates empirical resistances of exemplary electrodes of various carbon black percentages.

The electrodes 202 can have a resistance at or below 3 k$\Omega$ and a resistivity of less than 20 $\Omega$-m, or less than 15 $\Omega$-m, or less than 10 $\Omega$-m, thereby achieving parameters suitable for bioelectronics. For example, in some optional aspects, the resistivity can be about 12.5±0.93 $\Omega$-m. In some aspects, the electrodes 202 can have a resistance between 1.5 and 3 k$\Omega$. It should be understood that other sensors comprising carbon black and PDMS have been produced for applications such as strain gauges. However, such other sensors have resistances of at least 20 k$\Omega$, rendering them inoperable or unusable for bioelectronics (e.g., as a bioelectronics electrode component of a bioelectronics sensor). FIG. 6A illustrates empirical resistivities of exemplary electrodes of various carbon black weight percentages. FIG. 6B illustrates empirical resistances of exemplary electrodes of various carbon black weight percentages. Table 2 illustrates resistance, resistivity, and confidence data for the exemplary electrodes of different carbon black weight percentages.

TABLE 2

| CB-PDMS | mean ± st. dev; n = 3 samples; representative loop selected | | |
| --- | --- | --- | --- |
| (%) | r² of Slope (I-V) | Resistance (k$\Omega$) | Resistivity ($\Omega$-m) |
| 10 | 0.991 ± 0.006 | 66.7 ± 24 | 504.4 ± 178 |
| 14 | 0.996 ± 0.002 | 8.70 ± 2.7 | 67.2 ± 21 |
| 18 | 0.998 ± 0.001 | 6.11 ± 2.8 | 47.9 ± 22 |
| 25 | 0.998 ± 0.001 | 1.51 ± 0.1 | 12.5 ± 0.93 |

Figure 2:
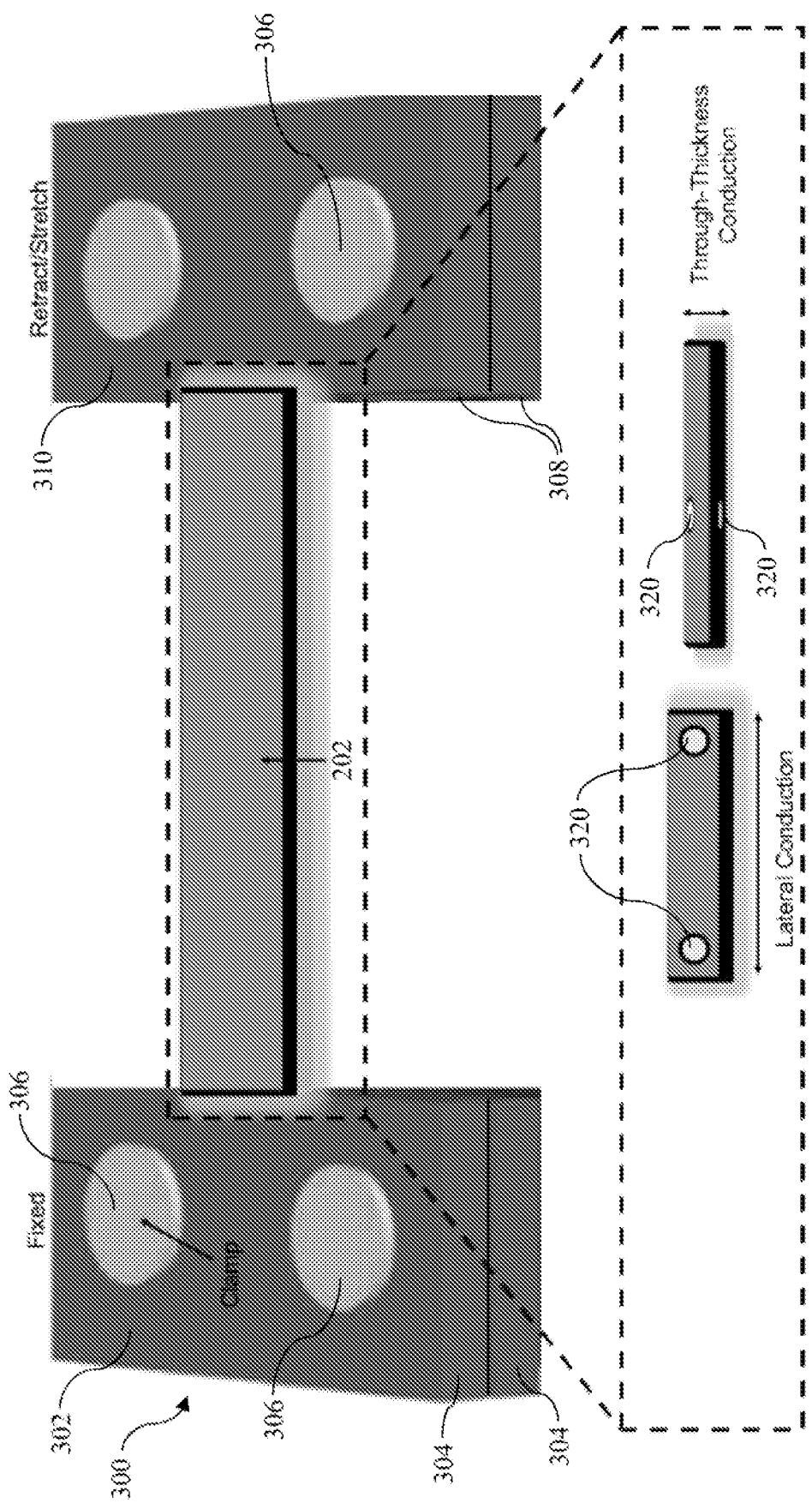
FIG. 2 illustrates a test apparatus for measuring the flexible nonmetallic electrode of FIGS. 1A-1B.

FIG. 2 illustrates a test apparatus 300 for testing strain on the electrode sample. The test apparatus comprises a first fixed clamp 302. The clamp 302 can comprise a pair of plates 304 that can be pulled together (e.g., by tightening a pair of screws 306) to compressively engage a first end of the electrode sample therebetween. A second end of the electrode sample can be compressively engaged between plates 310 of a second clamp 308. An actuator can move the first clamp away from the second clamp to apply strain to the sample electrode. Further, FIG. 2 defines the structural properties of the electrodes. Lateral conduction can be tested by placing probes 320 equally spaced on each longitudinal end of the electrode. Through-thickness conduction can be tested by placing probes 320 at various points on opposite faces of the electrode. Copper tape, for example, can be used to affix the probe leads. The sample electrode was under 0% strain for all measurements for the empirical data provided herein. However, in further optional aspects, the through-thickness conduction or lateral conduction can be measured on sample electrode as the sample is undergoing stress on the test apparatus 300. In some optional aspects, it is contemplated that the through-thickness conductivity can be less than the lateral conductivity. Thus, in some aspects, the through-thickness conductivity can be less than 12.5 $\Omega$-m, or less than 10 $\Omega$-m, or about 1.5 $\Omega$-m. The electrodes 202 can be optimized to have (1) a maximum current amplitude thereacross; (2) a consistent current distribution across the electrode surface; and (3) a minimum lateral and through thickness resistance and resistivity. In some aspects, ten volts across exemplary electrodes with dimensions of four cm long, one cm wide, one mm thick provided about seven mA. Over long durations (e.g., above four hours), the electrode can exhibit little-to-no fatigue. That is, its performance does not change substantially over time. Further, the electrodes 202 can have no measurable difference between physiological temperature and room temperature. Thus, the electrodes 202 can be used in treating and monitoring human health and performance.

The flexibility of the electrode can be quantified in terms of the material's Young's modulus. The Young's modulus of the electrode can increase with increasing carbon black concentration. However, it can be observed that, in certain circumstances, the Young's modulus can decrease slightly between 18% and 25% carbon black. Thus, the electrodes 202 can be distinguishable from commercially available electrodes such as, for example RED DOT Ag/AgCl electrodes provided by 3M, which are not flexible or stretchable. The commercially available electrodes are encapsulated with a conductive gel overlaid with an adhesive on a foam bedding to adhere to the stratum corneum. The commercially available electrodes cause irritation in at least 10% of patients, have limited shelf stability and disposability, and demonstrate signal degradation over time. Thus, use of the commercially available electrodes is limited outside of clinical environments. The electrodes as disclosed herein have desirable properties that can allow the electrodes to adhere to the irregular topography of the stratum corneum.

Figure 7:
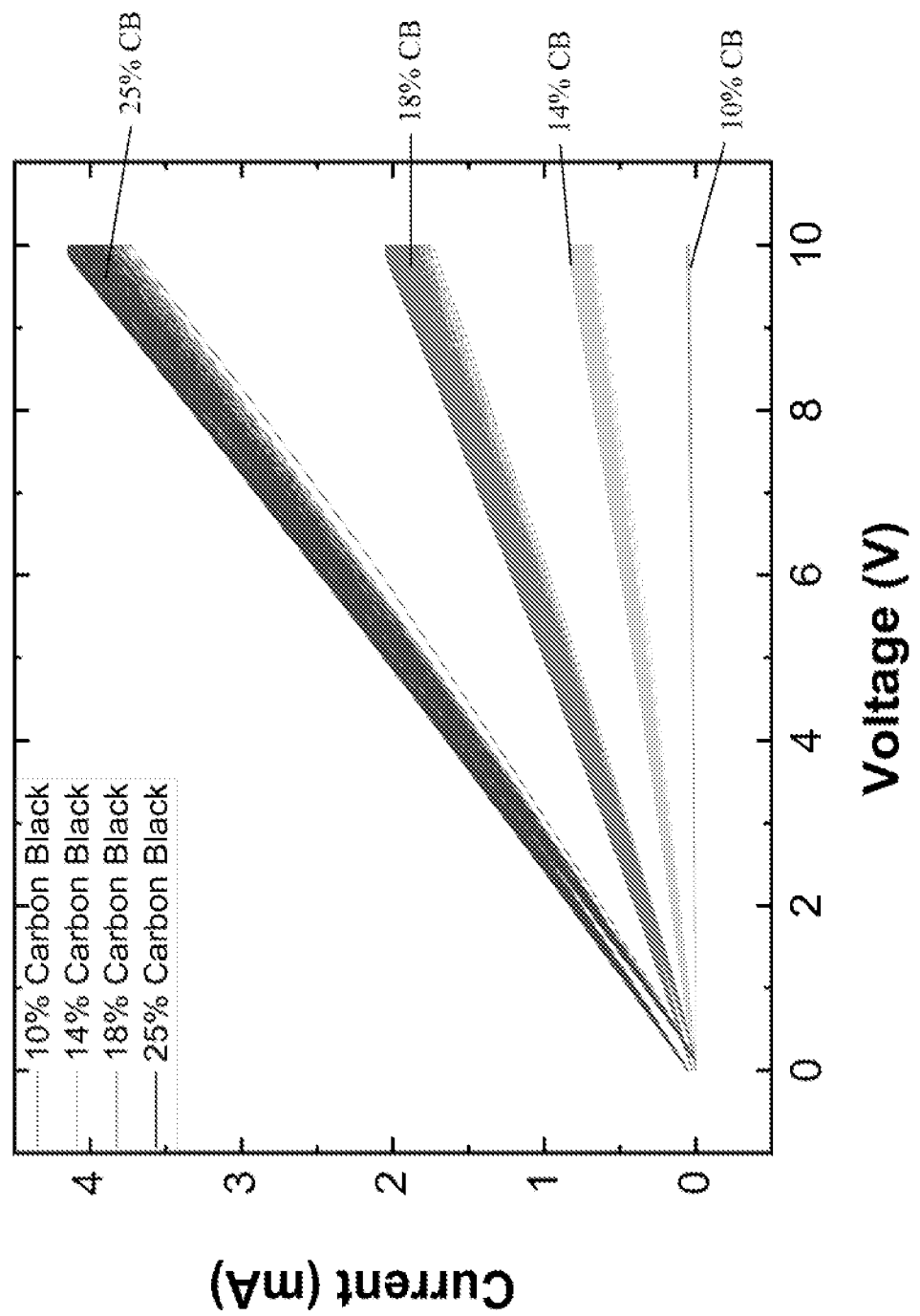
FIG. 7 shows a plot of I-V (current vs voltage) sweep for electrodes having various carbon black weight percentages.

FIGS. 7-17B illustrate various properties of different electrodes. Such properties can be used to select an application for the electrode as well as a preferable carbon black weight percentage for said application. FIG. 7 shows a plot of I-V (current vs voltage) sweep for electrodes having various carbon black weight percentages. The plots indicate that the electrodes disclosed herein exhibit ohmic behavior.

Figure 8:
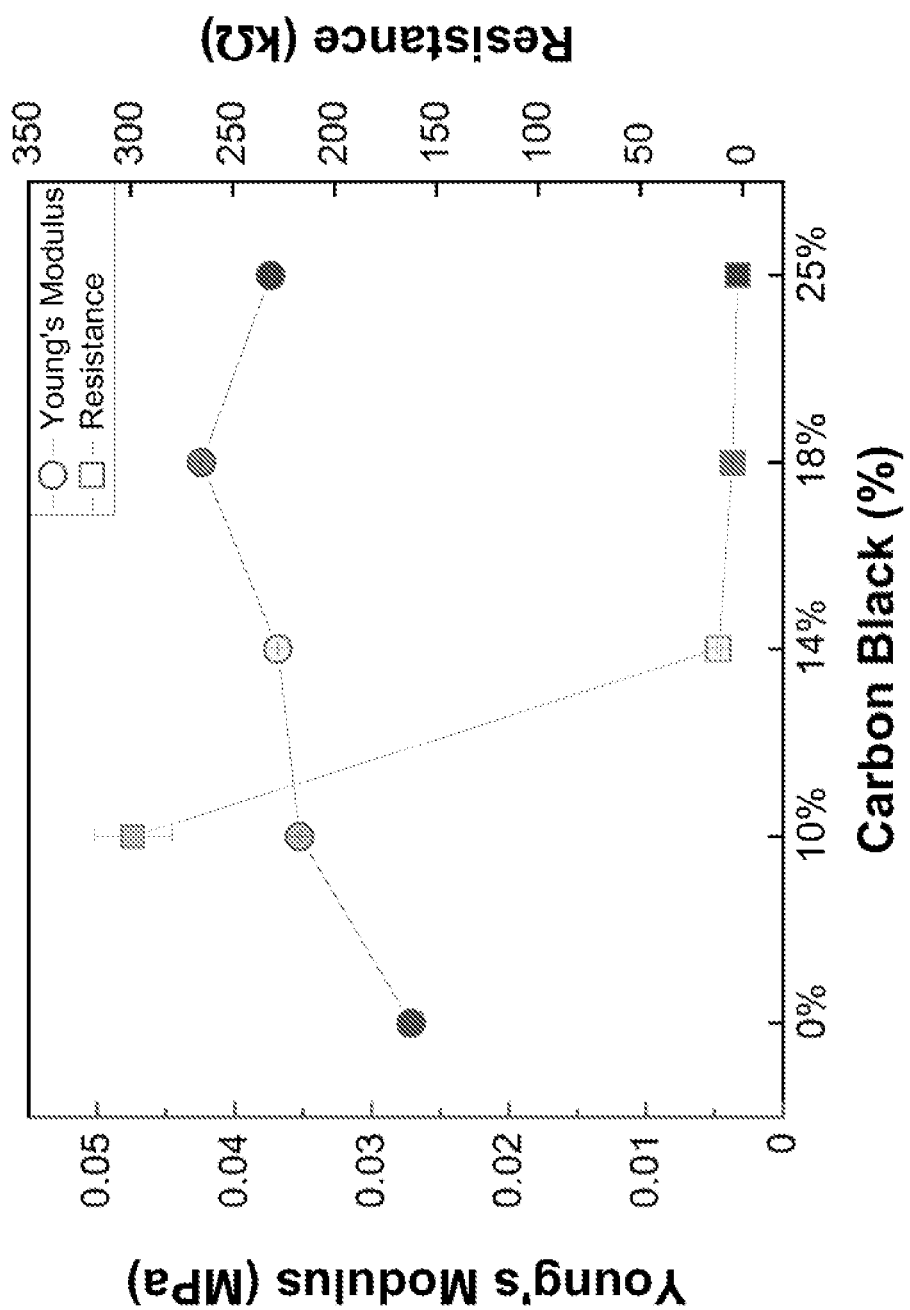
FIG. 8 shows a plot of the Young's modulus and resistance as a function of carbon black weight percent.

FIG. 8 shows a plot of the Young's modulus and resistance as a function of carbon black weight percent. As can be seen, resistance can decrease sharply from 10% weight percent carbon black to 14% weight percent carbon black. Accordingly, for certain applications, a weight percent carbon black above 10% can be desirable.

Figure 9:
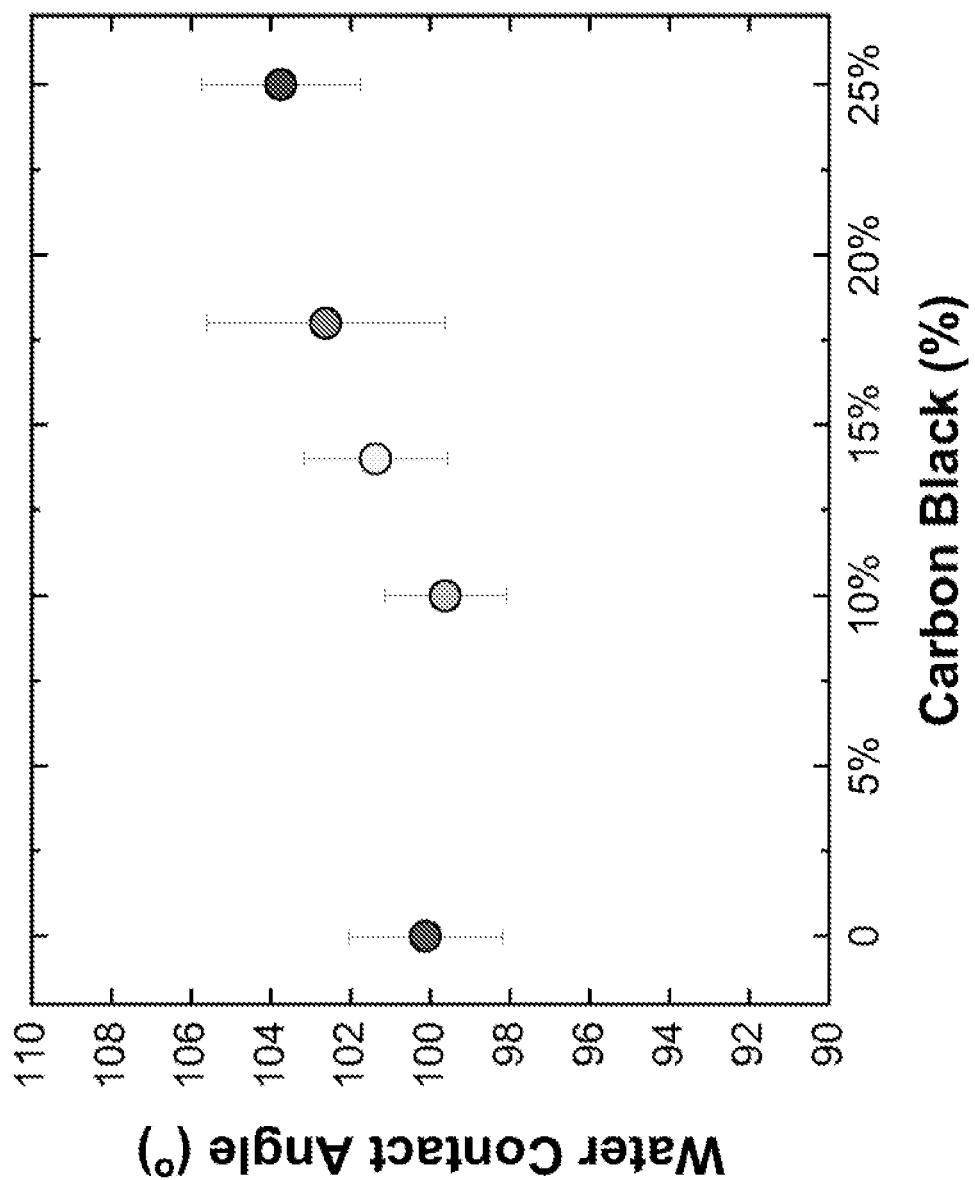
FIG. 9 shows a plot of the water contact angle with the electrode (corresponding to hydrophilic/hydrophobic nature of the electrode) as a function of carbon black weight percent.

FIG. 9 shows a plot of the water contact angle with the electrode (corresponding to hydrophilic/hydrophobic nature of the electrode) as a function of carbon black weight percent. As can be seen, additional weight percentage of carbon black can leave the water contact angle relatively unchanged. Thus, the additional weight percent of carbon black up to 25% does not significantly inhibit the hydrophilic nature of the PDMS.

Figure 10B:
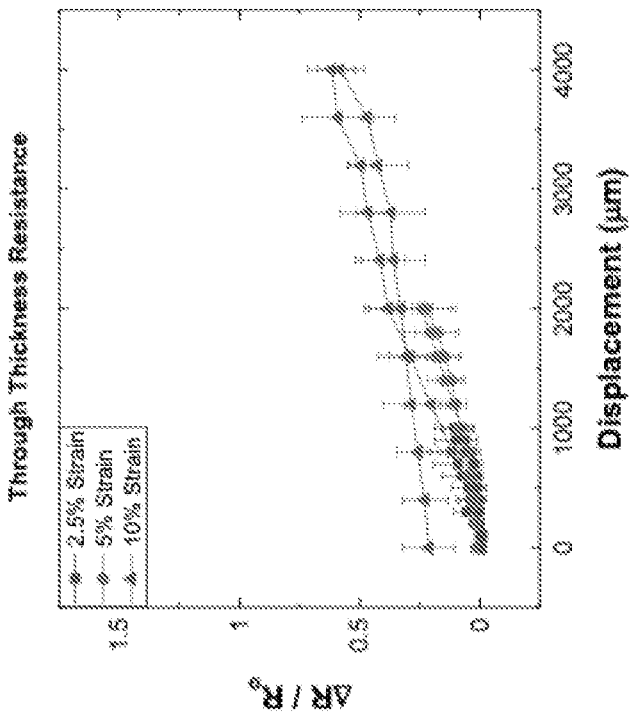
FIG. 10B shows hysteresis curves for the through thickness resistance change for 2.5% strain, 5% strain, and 10% strain in the electrode.
Figure 10A:
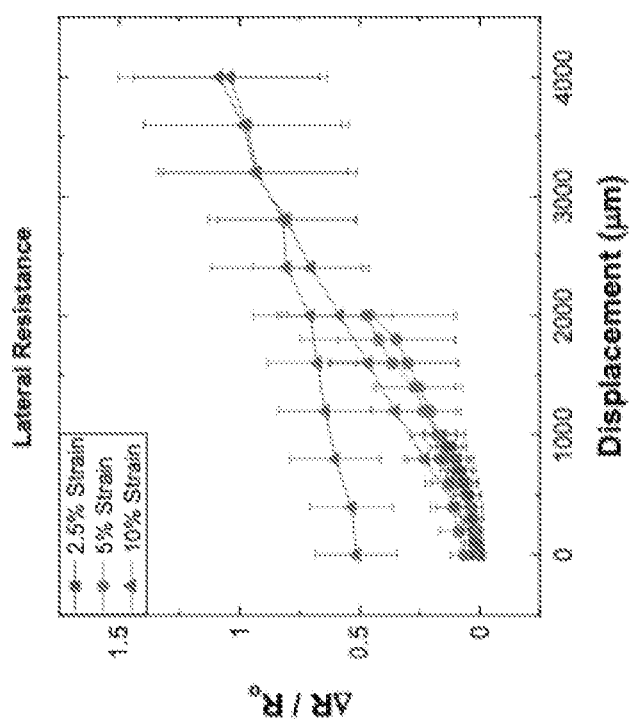
FIG. 10A shows hysteresis curves for the lateral resistance change for 2.5% strain, 5% strain, and 10% strain in the electrode.

FIG. 10A shows hysteresis curves for the lateral resistance change for 2.5% strain, 5% strain, and 10% strain in the electrode. FIG. 10B shows hysteresis curves for the through thickness resistance change for 2.5% strain, 5% strain, and 10% strain in the electrode. As can be seen, lateral and through thickness resistance can return to their respective initial values after a cycle of strain up to at least 5%. Thus, no significant permanent changes to the resistance are detected after a cycle of strain up to at least 5%.

Figures 11A, 11B:
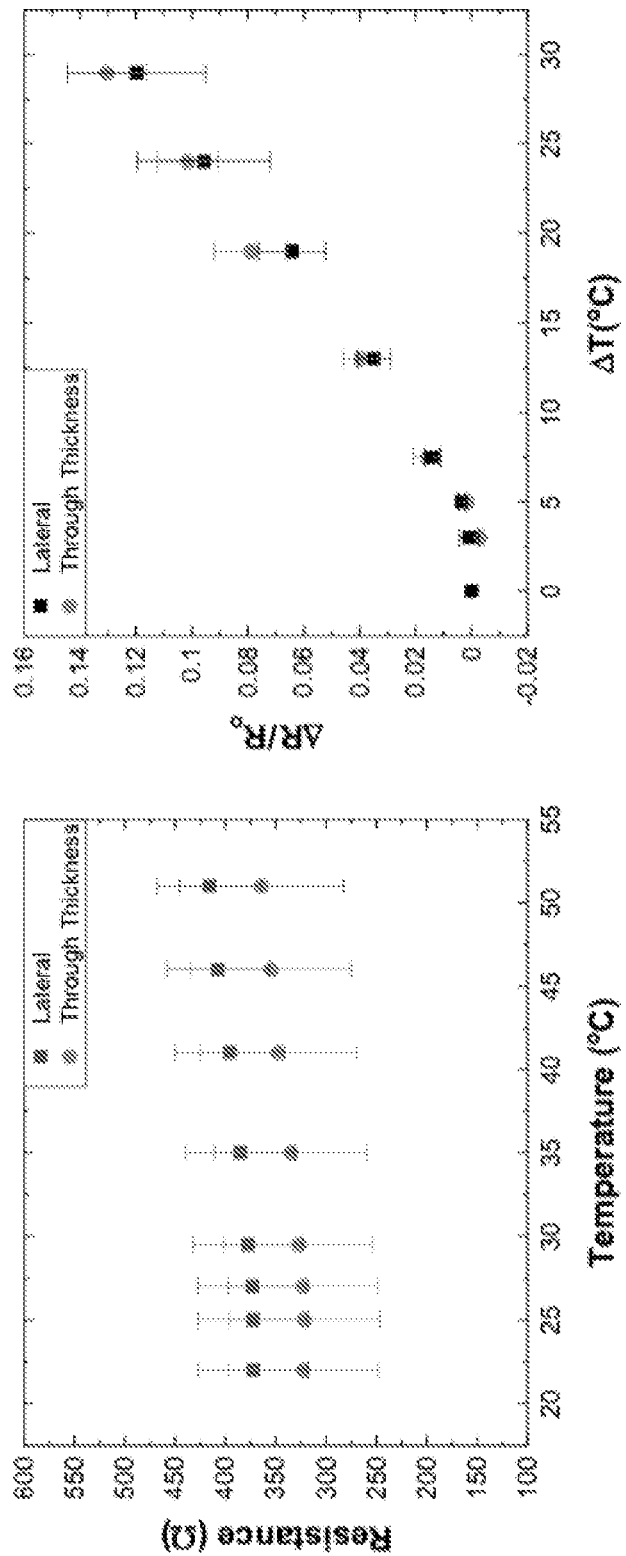
FIG. 11A shows lateral and through thickness resistances as a function of temperature.
FIG. 11B shows lateral and through thickness resistance changes as a function of temperature.

FIG. 11A shows lateral and through thickness resistances as a function of temperature. FIG. 11B shows lateral and through thickness resistance changes as a function of temperature. As can be seen, a small but noticeable change in resistance can be detected. However, a temperature sensor can be used in conjunction with the electrode to scale the resistance based on temperature. For example, a controller can apply a correction factor to correct for resistance due to temperature change.

FIG. 12A illustrates impedance as a function of frequency for a dry conventional hydrogel electrode and a dry carbon black-PDMS electrode. FIG. 12B illustrates impedance as a function of frequency for a conventional hydrogel electrode and a carbon black-PDMS electrode that have each been wet for one day. FIG. 12C illustrates impedance as a function of frequency for a conventional hydrogel electrode and a carbon black-PDMS electrode that have each been wet for seven days. FIG. 12D illustrates impedance as a function of frequency for a dry conventional hydrogel electrode and a dry carbon black-PDMS electrode. FIG. 12E illustrates impedance as a function of frequency for a conventional hydrogel electrode and a carbon black-PDMS electrode that have each been wet for one day. FIG. 12F illustrates impedance as a function of frequency for a conventional hydrogel electrode and a carbon black-PDMS electrode that have each been wet for seven days. As can be seen, the carbon black-PDMS exhibits a more constant impedance over the various frequencies, both wet and dry, than the conventional hydrogel electrode.

Figure 13A:
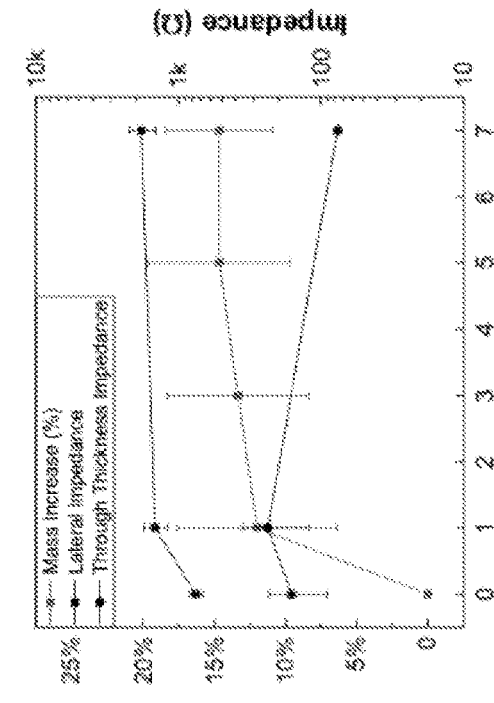
FIG. 13A shows a plot of absorption of phosphate buffer saline (pH 7.4) in a carbon black-PDMS electrode and a control commercial hydrogel electrode (Axelgard-735).
Figure 13B:
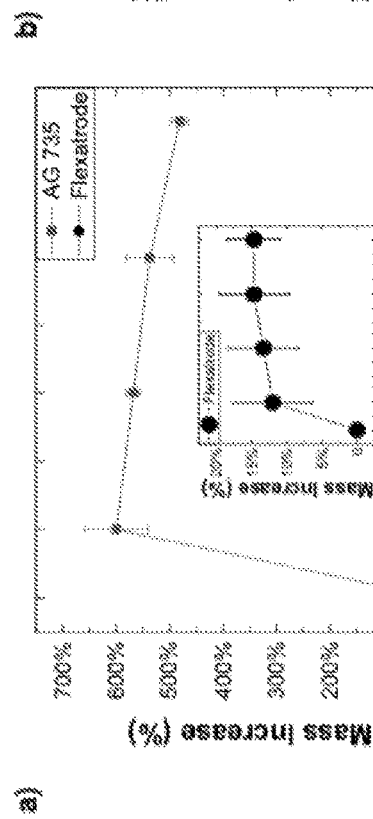
FIG. 13B shows a plot of the lateral impedance and the through thickness impedance as compared to mass increase from soaking for a carbon black-PDMS electrode.
Figure 13C:
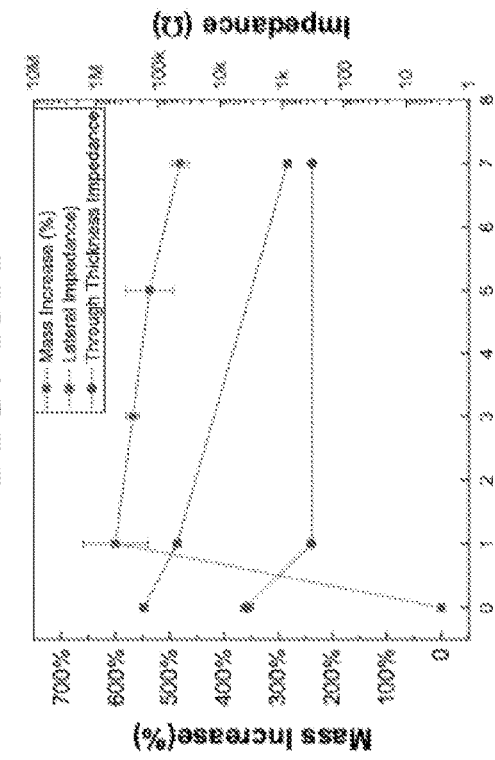
FIG. 13C shows a plot of the lateral impedance and the through thickness impedance as compared to mass increase from soaking for the control commercial hydrogel electrode.

FIG. 13A shows a plot of absorption of phosphate buffer saline (pH 7.4) in a carbon black-PDMS electrode and a control commercial hydrogel electrode (Axelgard-735). It can be seen that the carbon black-PDMS electrode is absorbent but not as absorbent as the commercial hydrogel electrode. FIG. 13B shows a plot of the lateral impedance and the through thickness impedance as compared to mass increase from soaking for a carbon black-PDMS electrode. As can be seen, the lateral and through thickness impedance remains substantially constant as the solution is absorbed. FIG. 13C shows a plot of the lateral impedance and the through thickness impedance as compared to mass increase from soaking for the control commercial hydrogel electrode.

Figure 14:
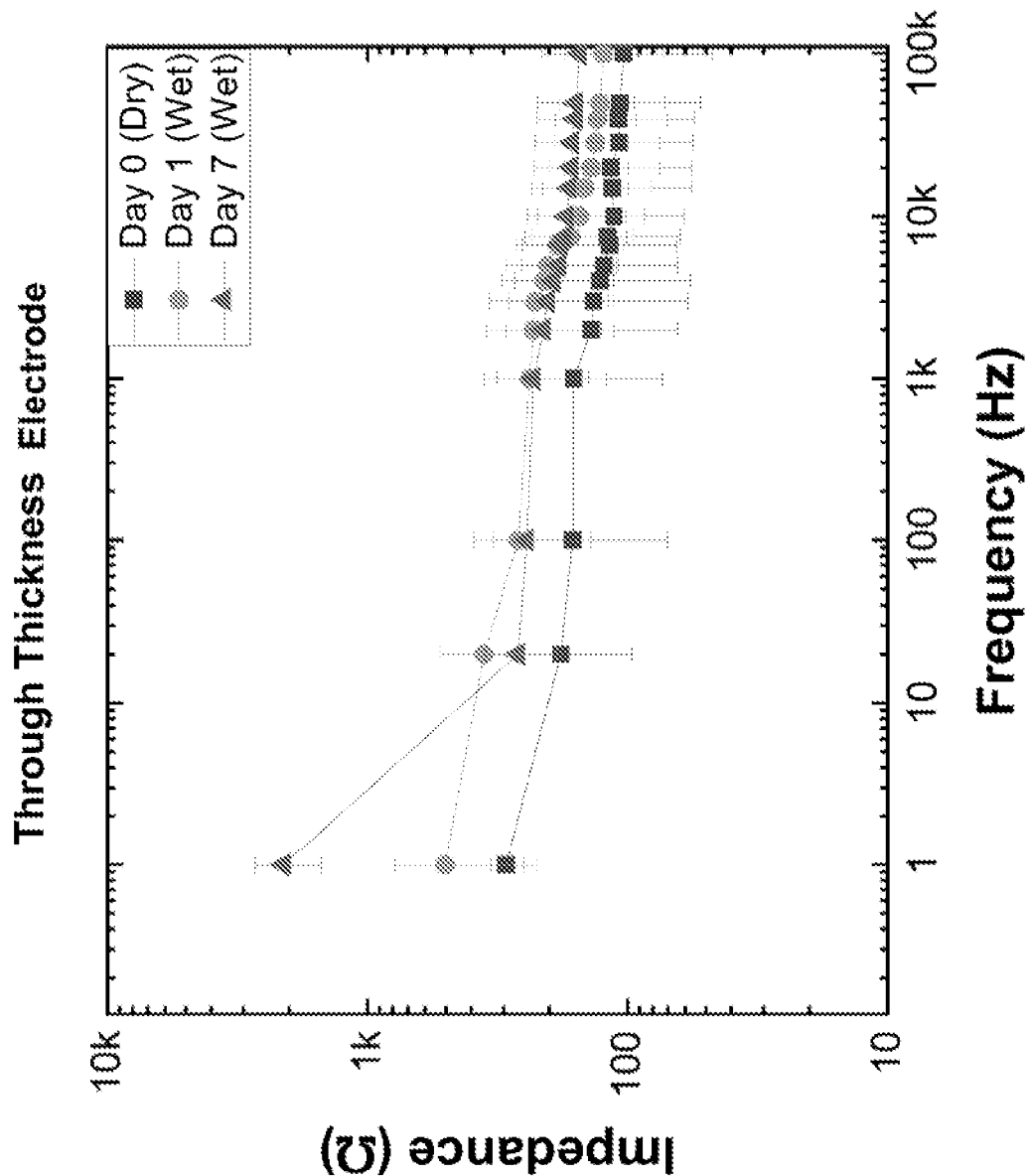
FIG. 14 shows a plot of impedance as a function of frequency for a carbon black-PDMS electrode that is dry, has been soaked for one day, and has been soaked for 7 days.

FIG. 14 shows a plot of impedance as a function of frequency for a carbon black-PDMS electrode that is dry, has been soaked for one day, and has been soaked for 7 days. It can be noted that the shift in impedance from soaking is relatively uniform across the frequencies from 10 Hz to 100 kHz.

Figure 15:
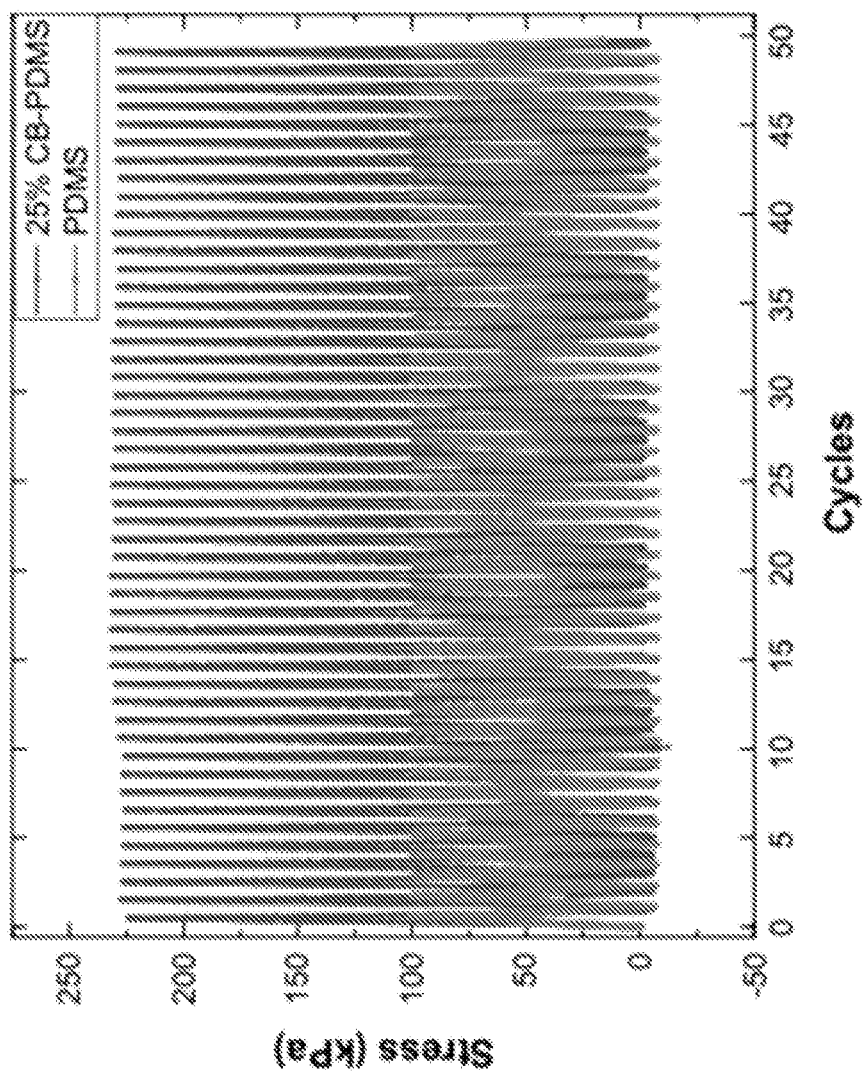
FIG. 15 shows a plot of stress over 50 cycles in a 25% weight percent carbon black-PDMS electrode and a 0% weight percent carbon black PDMS control element.

FIG. 15 shows a plot of stress over 50 cycles in a 25% weight percent carbon black-PDMS electrode and a 0% weight percent carbon black PDMS control element. As can be seen, the carbon-black increases stress of the material. However, the peak stress remains constant over repeated cycling.

Figure 16:
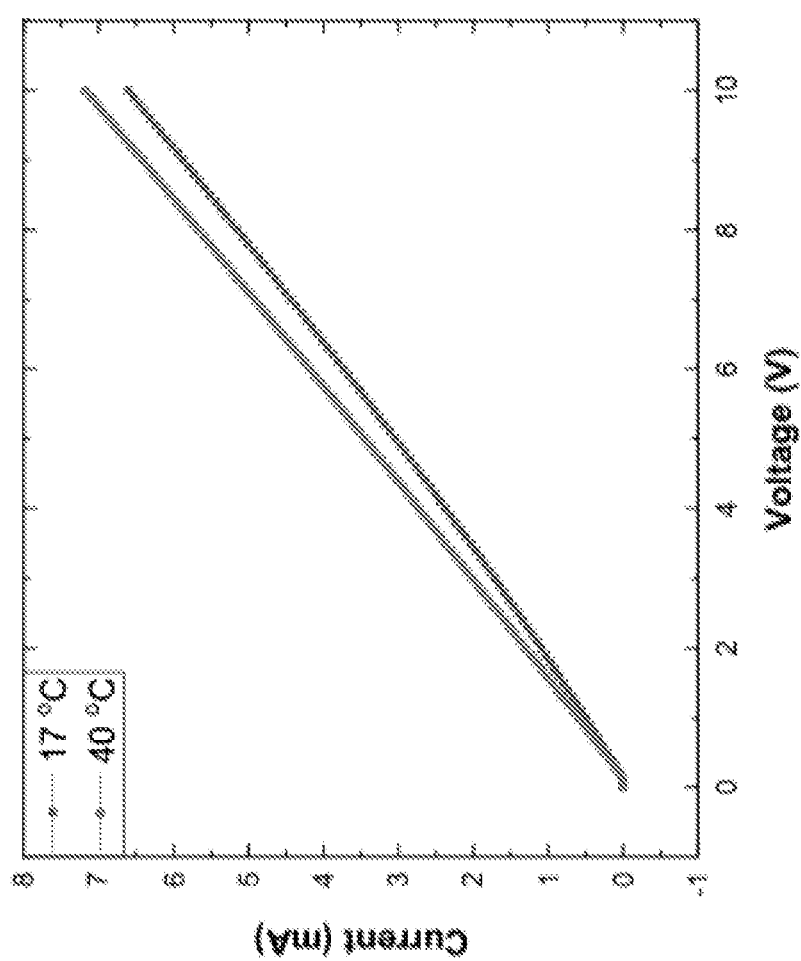
FIG. 16 shows a plot of current versus voltage for an electrode at two different temperatures.

FIG. 16 shows a plot of current versus voltage for two different temperatures. As can be seen, a small but noticeable change in resistance can be detected. However, a temperature sensor can be used in conjunction with the electrode to scale the resistance based on temperature. For example, a controller can apply a correction factor to correct for resistance due to temperature change.

Figure 17A:
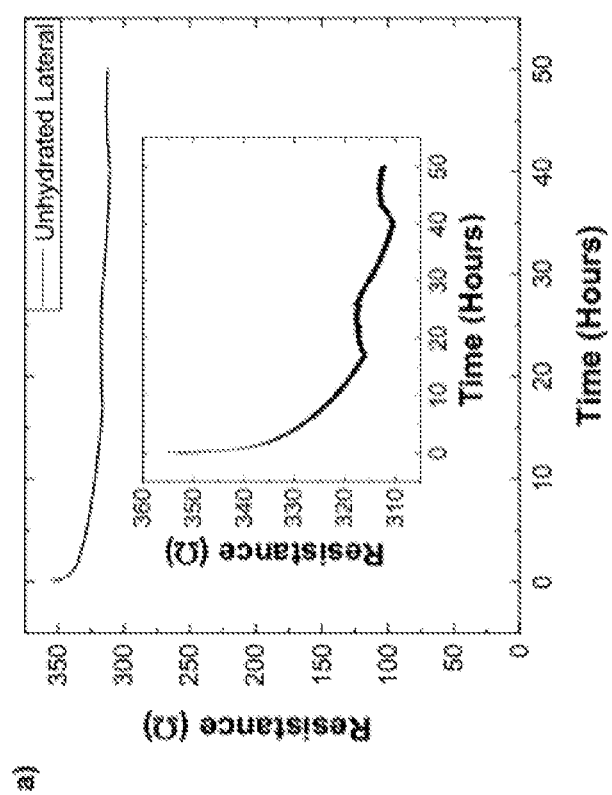
FIG. 17A shows a plot of resistance vs time for a carbon black-PDMS electrode when subject to electrical actuation (3000 loops over a 5-hour period).
Figure 17B:
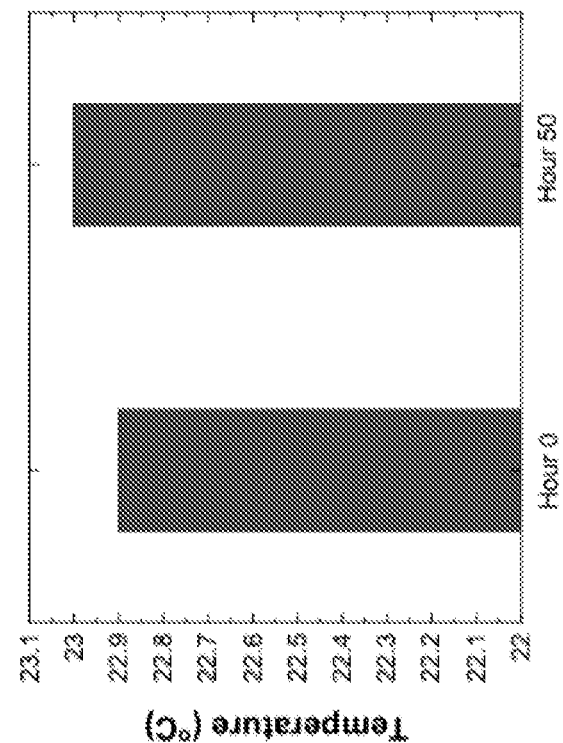
FIG. 17B illustrates a measurement of heat generation of the electrode at hour 0 and hour 50 during testing to provide the data of FIG. 17A.

FIG. 17A shows a plot of resistance vs time for a carbon black-PDMS electrode when subject to electrical actuation (3000 loops over a 5-hour period). It can be seen that, after an initial burn-in, the resistance of the electrode levels out at around 320 ohms. FIG. 17B illustrates a measurement of heat generation of the electrode at hour 0 and hour 50 during testing to provide the data of FIG. 17A. The temperature measurements were captured with an infrared camera. As can be seen, the 0.1° C. increase in heat output by the electrode after 50 hours indicates the thermal stability of the electrode.

Carbon Black Polyvinyl Alcohol Nanocomposite

In some exemplary aspects, an electrode 202 can comprise carbon black-polyvinyl alcohol (PVA) nanocomposite. In various optional aspects, it is contemplated that the electrodes can consist of, or consist substantially of, PVA and carbon black. The carbon black-PVA nanocomposite electrode can be less hydrophobic than carbon black-PDMS and can therefore be particularly beneficial in applications that require wicking of bodily fluids concurrently with delivery of surface stimulation as further disclosed herein. It is contemplated that the carbon black-PVA nanocomposite electrode can be absorbent (hydrophilic), biocompatible, inexpensive, and scalable. The carbon black-PVA nanocomposite electrode can be stable long-term (e.g., about 5 hours or at least 5 hours).

To make the carbon black-PVA nanocomposite electrode, a first mixture of PVA (e.g., optionally, SIGMA ALDRICH #MKCK8710) and glycerol (e.g., optionally, SIGMA ALDRICH #SHBL4351) can be mixed in water. It is contemplated that 5% glycerol can provide optimally stable crosslinked PVA due to hydrogen bonding between hydroxyl groups on the PVA and glycerol respectively. Optionally, before mixing, the water can be at 90° C. A second mixture can comprise carbon black added to water mixed (e.g., sonicated for 30 minutes as described above) in a desired weight relative to the weight of the first mixture (if it were to cure without the carbon black) to provide a desired weight percentage when the first and second mixtures are mixed and cured. The first and second mixtures can be combined (e.g., the second mixture can be added to the first mixture) to form a slurry. The slurry can be mixed (e.g., with a magnetic stirrer) for a mixing duration (e.g., optionally, about 10 minutes). The slurry can be poured into a mold and allowed to cure (e.g., overnight).

In one exemplary, optional aspect, the electrode 202 comprising carbon black-PVA can have a thickness of between about 10 microns and about 10 mm, or between 50 microns and 200 microns, or about 100 microns. The thickness of the electrode can be selected, for example, by the depth of the mixture provided into the mold. Thus, different electrode dimensions can be obtained based on mold size, shape, and volume of mixture deposited therein.

In some aspects, the carbon black weight of the electrode 202 comprising carbon black-polyvinyl alcohol (PVA) nanocomposite can be from about 10% to about 50% of the weight of the PVA (corresponding to a "weight percent" of about 10% to about 50%). In various aspects, the carbon black weight percent (i.e., the ratio of the weight/mass of the carbon black to the weight/mass of the PVA, expressed as a percentage) of the electrode 202 can be from about 5% to about 10%, from about 10% to about 20%, from about 20% to about 30%, from about 30% to about 40%, from about 40% to about 50%, from about 50% to about 60%, or from about 5% to about 60%, or from about 10% to about 60%, or from about 10% to about 55%, or from about 10% to about 50%, or less than 60%. It is contemplated that the PVA can form all, or substantially all of the remainder of the weight of the electrode. The weight percent of the carbon black of the electrode can be selected based on the desired properties of the electrode. For example, in some aspects, the weight percent of carbon black to PVA can be selected based on the amount of flexion required for a desired application. FIGS. 19-25 illustrate empirical properties of carbon black-PVA nanocomposite electrodes with different weight percentages.

Figure 19:
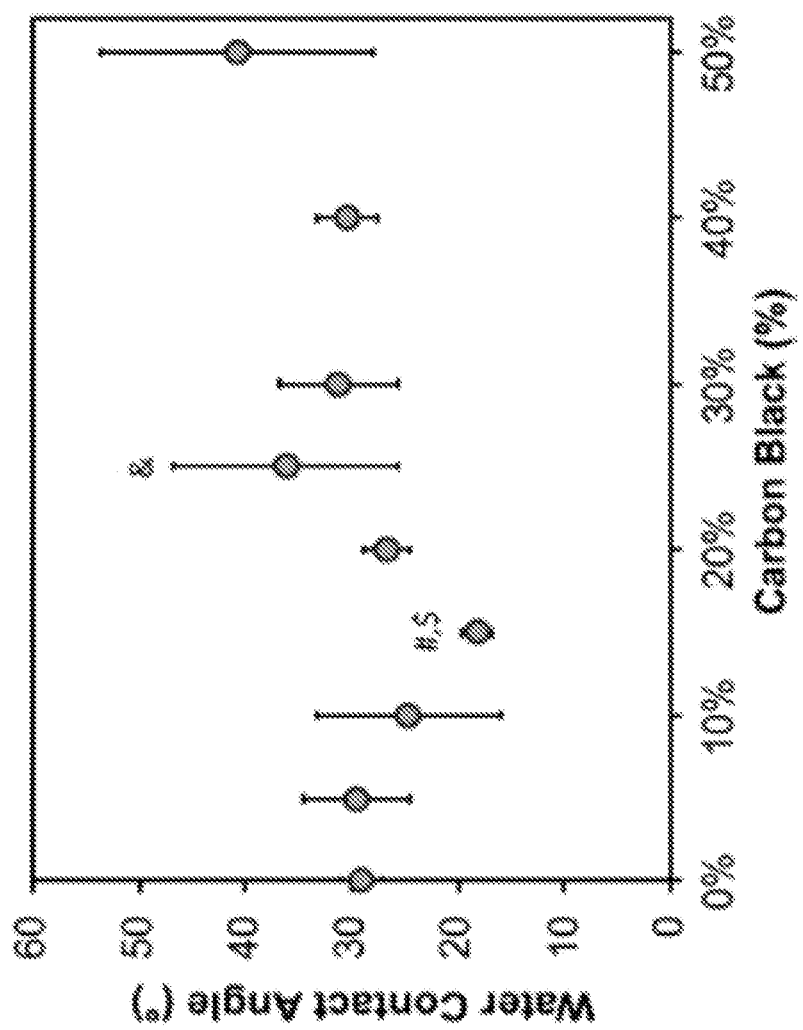
FIG. 19 shows a plot of water contact angle for carbon black-PVA electrodes having various carbon black weight percentages.

FIG. 19 shows a plot of water contact angle for electrodes having various carbon black weight percentages. As can be seen, hydrophilicity (corresponding to a lower contact angle) can increase from 0 to 15% and then decrease from 15-25%. The water contact angle can be substantially constant from 25-50%.

Figure 20:
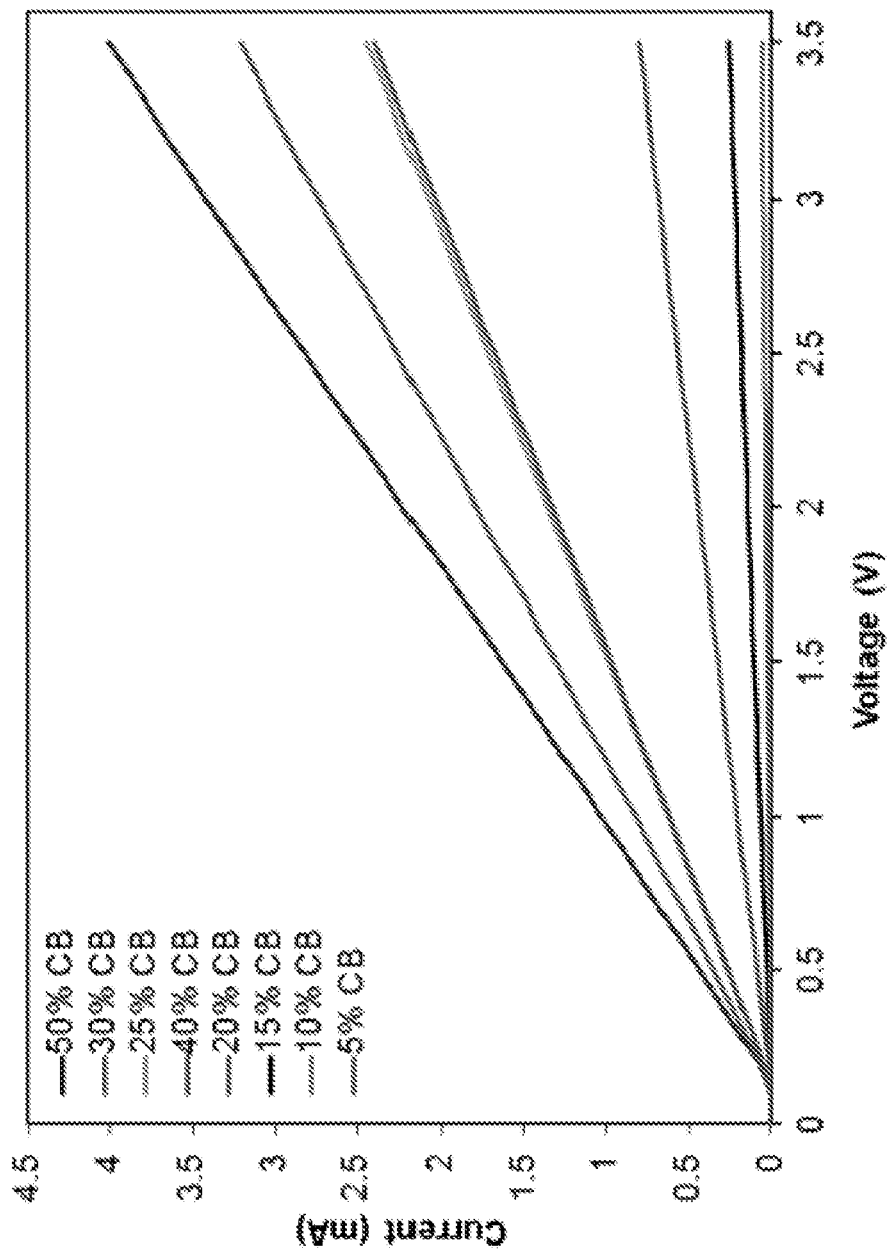
FIG. 20 shows an I-V (current vs voltage) sweep for carbon black-PVA electrodes having various carbon black weight percentages.

FIG. 20 shows an I-V (current vs voltage) sweep for electrodes having various carbon black weight percentages. The plots indicate that the electrodes exhibit ohmic behavior.

Figure 21:
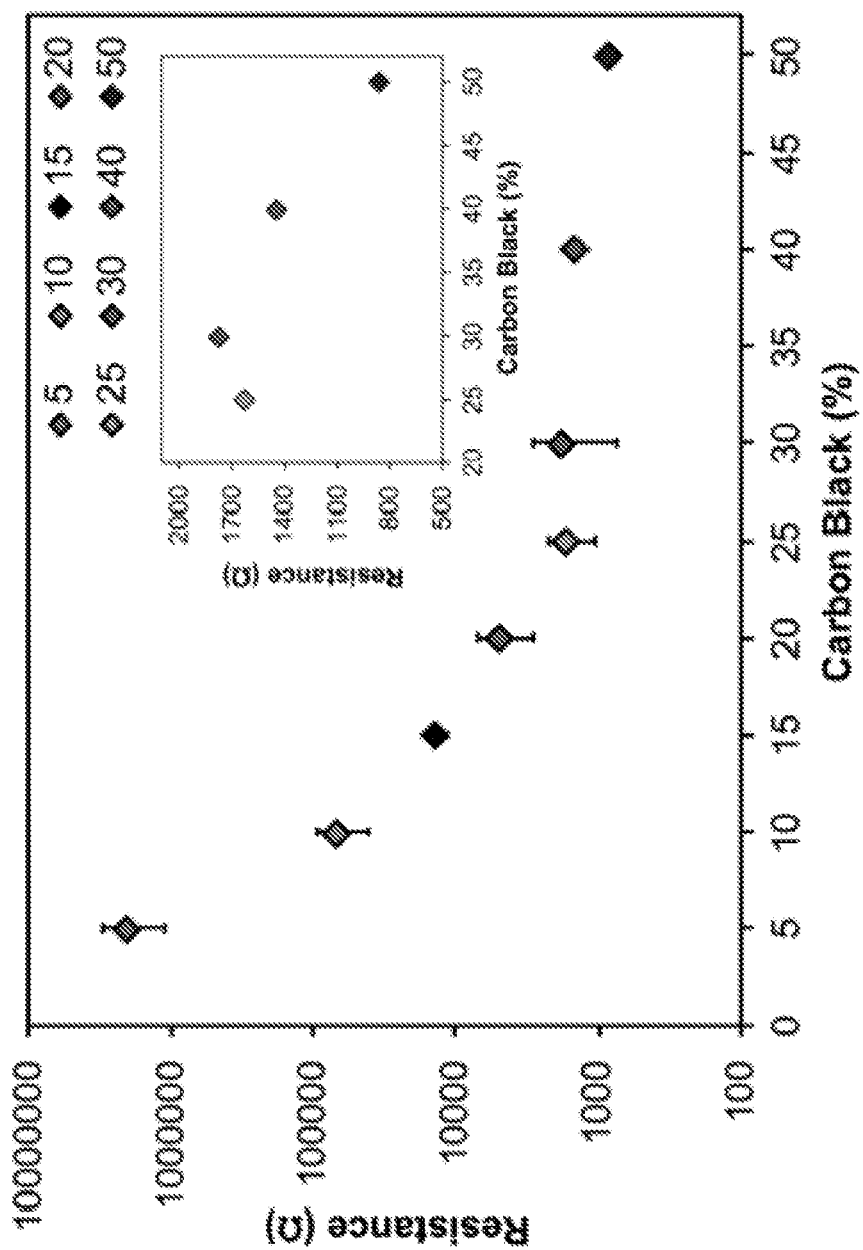
FIG. 21 shows a plot of resistance of carbon black-PVA electrodes at different carbon black percentages.

FIG. 21 shows a plot of resistance at different carbon black weight percentages. The following resistance values for each carbon black weight percentage are provided in said data: 5% (carbon black): 2.03±0.9 M$\Omega$, 10%: 66.9±2.7 k$\Omega$, 15%: 13.4±2 k$\Omega$, 20%: 4.9±2.0 k$\Omega$, 25%: 1.63±0.57 k$\Omega$, 30%: 1.78±0.1 k$\Omega$, 40%: 1.44±0.17 k$\Omega$, and 50%: 859±105$\Omega$.

Figure 22:
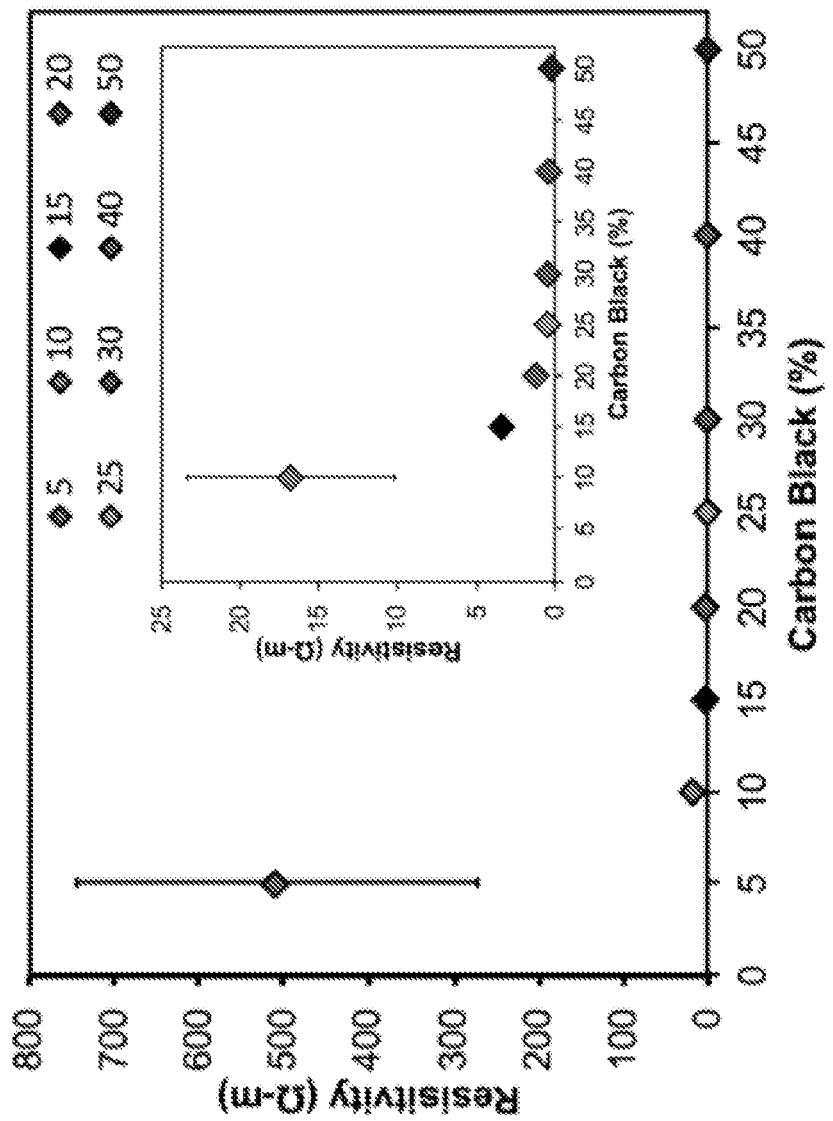
FIG. 22 shows a plot of resistivity of carbon black-PVA electrodes at different carbon black percentages.

FIG. 22 shows a plot of resistivity at different carbon black weight percentages. The following resistivity values for each carbon black weight percentage were determined from said data: 5% (carbon black): 509±236 $\Omega$-m, 10%: 16.7±6.7 $\Omega$-m, 15%: 3.37±0.51 $\Omega$-m, 20%: 1.22±0.50 $\Omega$-m, 25%: 0.407±0.14 $\Omega$-m, 30%: 0.443±0.25 $\Omega$-m, 40%: 0.36±0.04 $\Omega$-m, and 50%: 0.215±0.026 $\Omega$-m.

As illustrated in the data, in some aspects, a carbon black-PVA electrode having a weight percent of about 50% carbon black (i.e., the weight/mass of PVA is about 50% of the weight/mass of the PVA) can be optimal for certain applications, as it has a high conductively and low resistivity. It is contemplated that electrodes having a carbon black weight percent of 60% or more (i.e., the weight/mass of carbon black is 60% or more of the weight/mass of the PVA) can be excessively brittle for certain applications.

Figure 23:
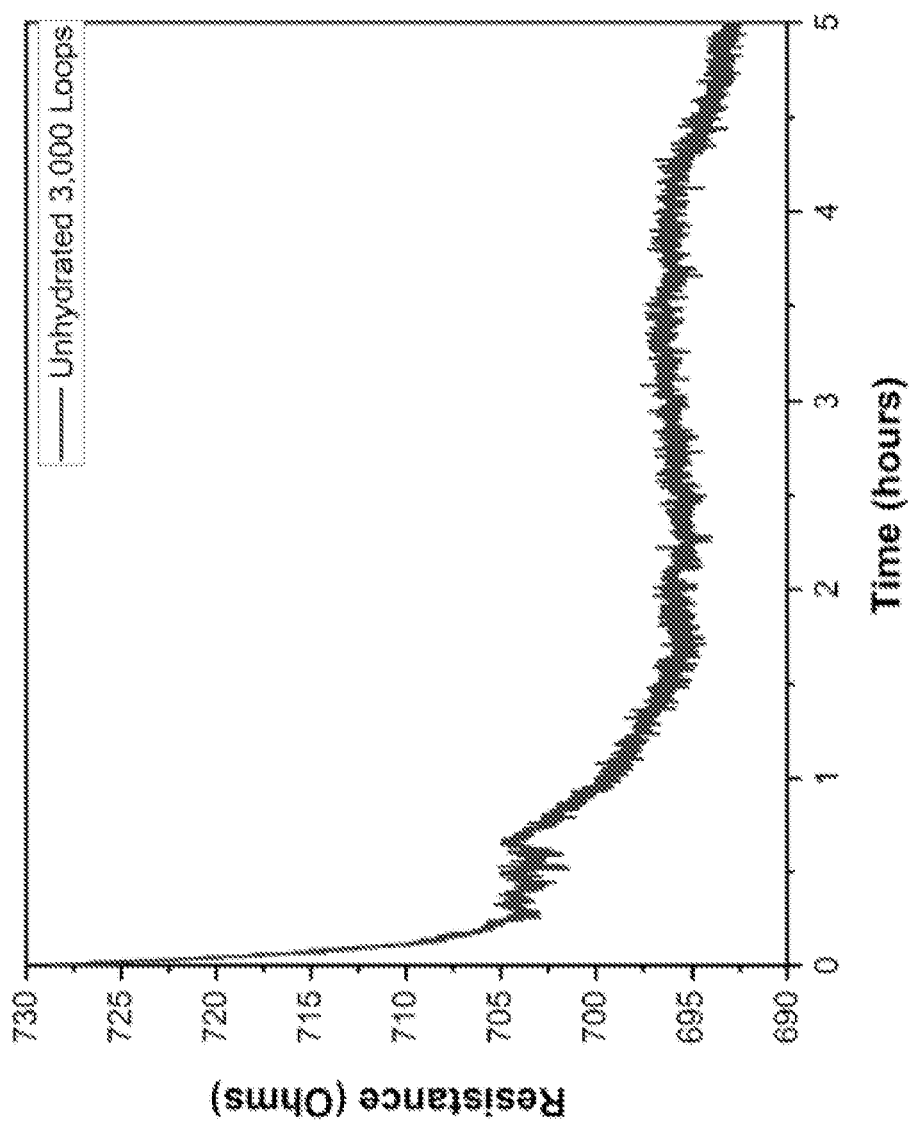
FIG. 23 shows a plot of resistance vs time for a 50% weight percent carbon black-PVA electrode when subject to electrical actuation (3000 loops over a 5-hour period).

FIG. 23 shows a plot of resistance vs time for a 50% weight percent carbon black electrode when subject to electrical actuation (3000 loops over a 5-hour period). As can be seen, after a 1.5 hour burn-in period, the resistance can remain constant at around 695 ohms.

Figure 24:
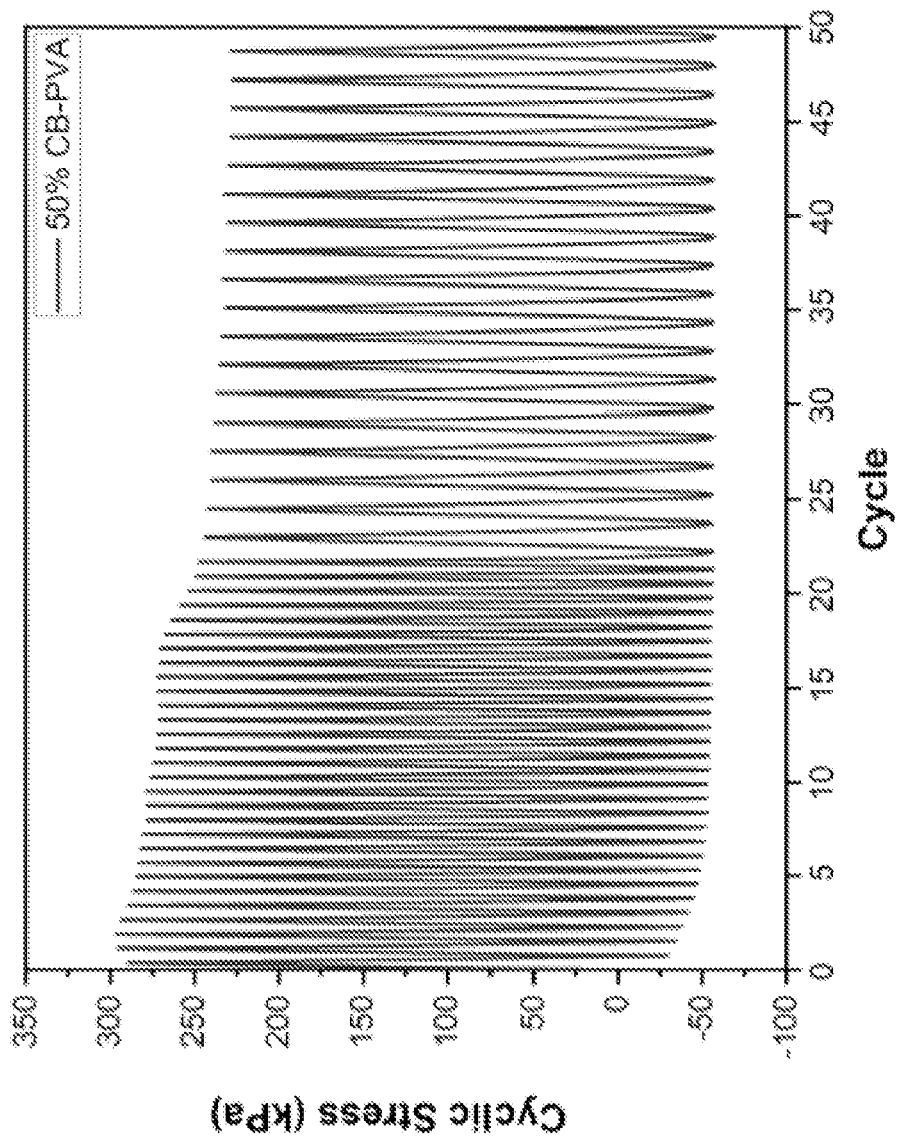
FIG. 24 shows a plot of cyclic stress over 50 cycles for a 50% weight percent carbon black-PVA electrode (using the test apparatus as shown in FIG. 2).

FIG. 24 shows a plot of cyclic stress over 50 cycles for a 50% weight percent carbon black electrode (using the test apparatus as shown in FIG. 2). As can be seen, the cyclic stress can stabilize at around the $25^{th}$ cycle at ~250 kPa.

Figure 25:
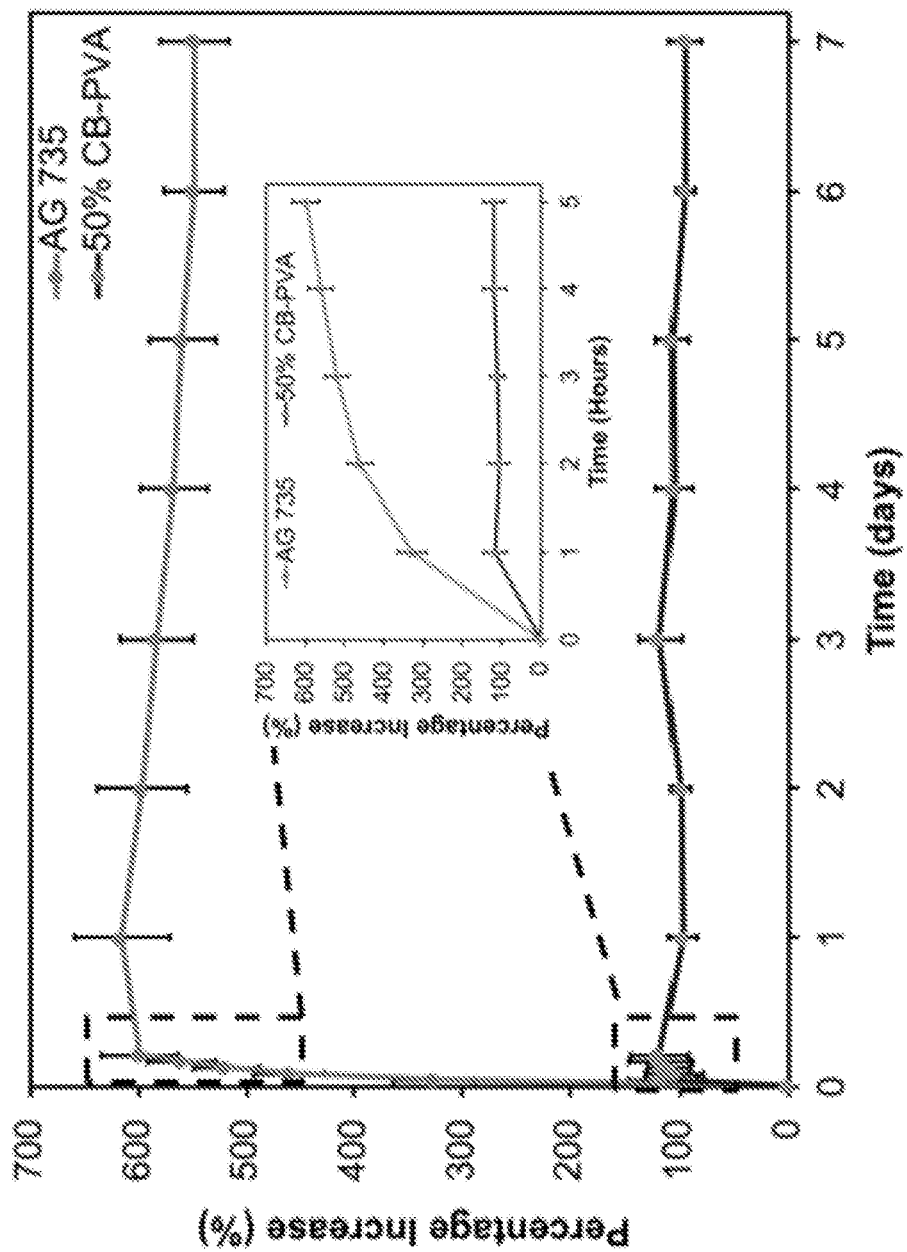
FIG. 25 shows a plot of a percentage increase in absorption of phosphate buffer saline (pH 7.4) in a 50% weight percent carbon black-PVA electrode and a control commercial hydrogel electrode (Axelgard-735).

FIG. 25 shows a plot of absorption of phosphate buffer saline (pH 7.4) in a 50% weight percent carbon black electrode and a control commercial hydrogel electrode (Axelgard-735). As can be seen, the carbon black does not substantially alter the hydrophilic absorption capabilities of the PVA.

Figure 26:
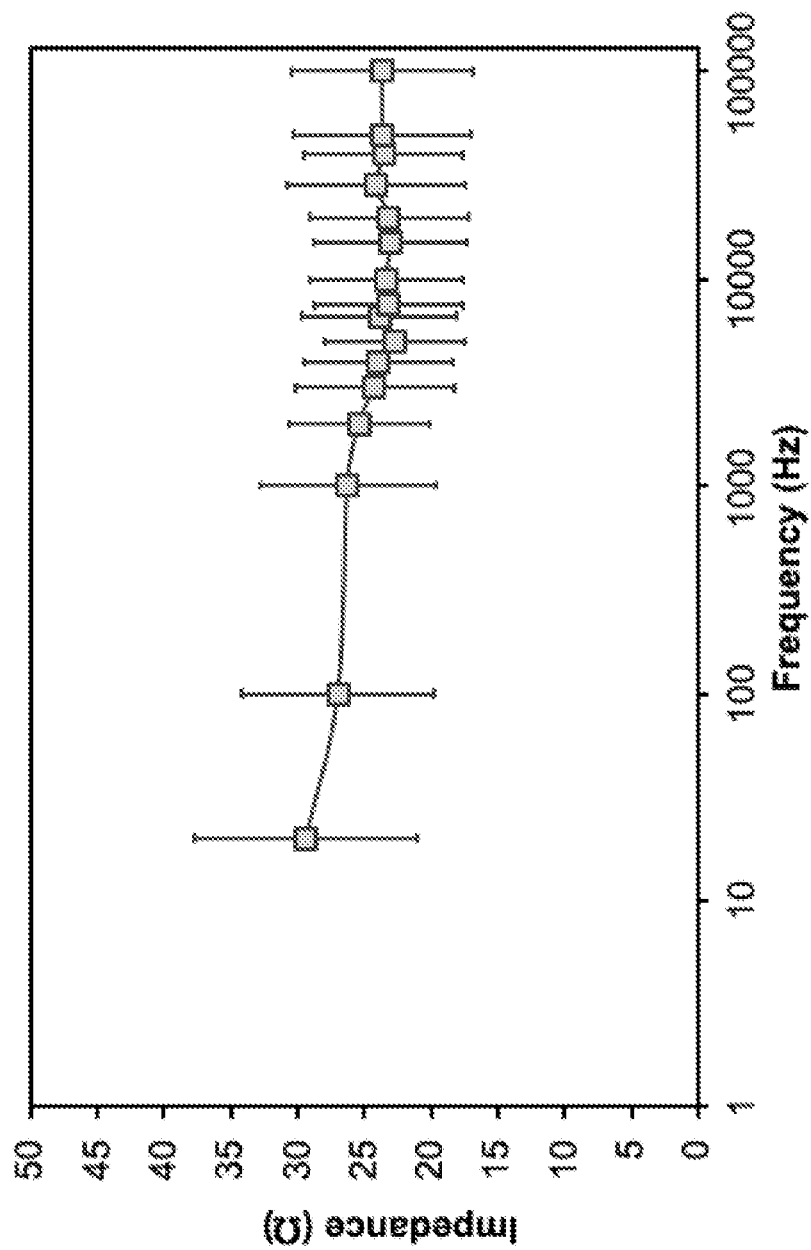
FIG. 26 shows the through thickness impedance of a dry 50% Carbon Black PVA electrode over the frequency range of 1-100 kHz.

FIG. 26 shows the through thickness impedance of a dry 50% Carbon Black PVA electrode over the frequency range of 1-100 kHz. As can be seen, the through thickness impedance can remain substantially constant across said frequency range.

Additional Electrode Assembly Components

With reference to FIG. 1A, the electrode assembly 200 can further comprise an adhesive patch 204 that is configured to attach to the skin of a patient. The adhesive patch can comprise, for example, a flexible polymer substrate and an adhesive on a skin contact side of the adhesive patch. A removable release layer (not shown) can be positioned on the adhesive opposite the substrate to protect the adhesive and electrodes 202 prior to application.

The electrode assembly 200 can further comprise a computing device (e.g., a microcontroller 206) that is in communication with the electrodes 202 via wires or other electrical leads 208. The computing device can be configured to receive signals from the electrodes 202 and process the signals (e.g., convert analog signals to digital and store the signals with correlated time values). Additionally, or alternatively, it is contemplated that the electrodes can wirelessly communicate with a remote computing device, such as, for example, a tablet, a smartphone, or a computer.

Figures 3A, 3B, 3C, 3D, 3E:
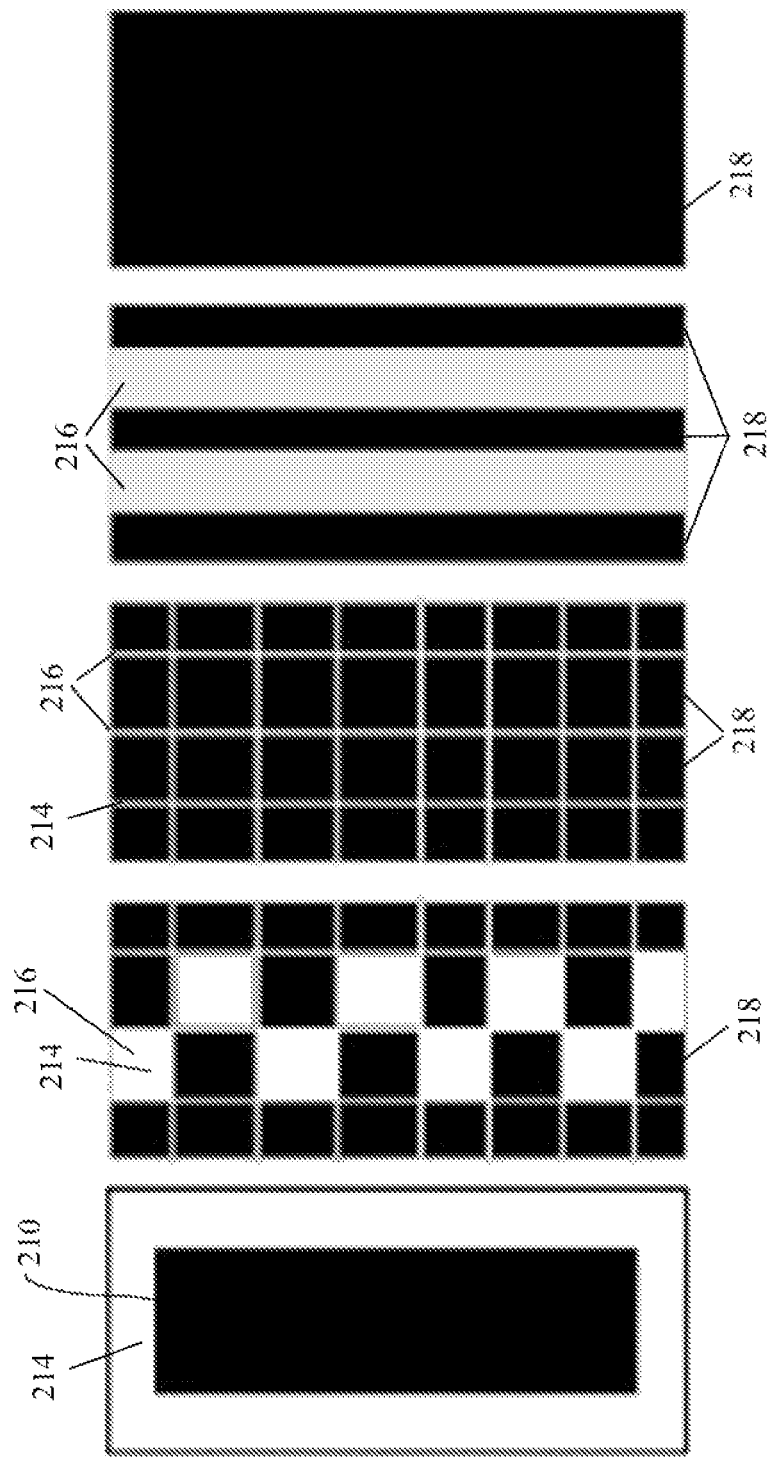
FIGS. 3A-3E illustrate alternative embodiments for patterns of hydrogel deposited on an electrode as disclosed herein.

Referring also to FIGS. 1A and 3A-3E, each of the electrodes 202 can have a contact side 210 and an opposing side 212, wherein the contact side 210 is configured to contact the stratum corneum (or other tissue) of the patient. A layer of hydrogel 214 (e.g., platinum-grade Ecoflex-35 gel) can be disposed on the contact side 210 of the electrodes 202 to adhere the electrode to the stratum corneum. When hydrogel 214 is not electrically conductive, it can be advantageous to minimize the surface area coverage of the electrodes 202, thereby maximizing the conductivity between the electrode and the stratum corneum. Accordingly, optionally, the layer of hydrogel 214 can be disposed in a pattern so that some areas 216 have hydrogel and some areas 218 do not. The ratio of surface area covered with hydrogel to surface area without hydrogel can be selected to promote sufficient adhesion while maximizing surface area contact between the electrode and the skin, thereby maximizing signal transfer between the electrode and the skin. Further, the pattern of distribution of the hydrogel can be selected to optimize adhesion while minimizing surface area distribution of the hydrogel. It is contemplated that some desirable patterns can comprise hydrogel deposited around the perimeter of the electrode (longitudinally and/or transversely). In some aspects, the hydrogel can follow a perimeter around the electrode 202. For example, in one exemplary pattern, as show in FIG. 3A, the hydrogel can extend around the entire perimeter of the electrode. In further aspects, the hydrogel can be formed in a rectangular grid pattern. For example, referring to FIG. 3C, the hydrogel can be in a rectangular grid with strips (optionally, thin strips) of hydrogel providing spacing between areas 218 without hydrogel. In a further example, referring to FIG. 3B, the areas 216 of hydrogel can alternate with areas 218 without hydrogel in a checkered pattern. Optionally, the longitudinal edges can be entirely or substantially entirely devoid of areas 216 of hydrogel so that a majority of the hydrogel is distributed near the center of the electrode 202. Referring to FIG. 3D, in some aspects, the hydrogel can be distributed in stripes (e.g., optionally, longitudinally extending rectangular areas). For example, two stripes of hydrogel (or more or fewer stripes) can extend along the length of the electrode. Optionally, the stripes can be positioned inwardly of the longitudinal edges of the electrode so that the longitudinal edges of the electrode comprise areas 218 without hydrogel. In still further aspects, with reference to FIG. 3E, there can be configurations of the electrode in which no hydrogel is distributed over the contact side 210 of the electrode 202. Optionally, the adhesive patch 204 can maintain such an electrode (without hydrogel) in engagement with the skin of the patient. In some aspects, the hydrogel can be distributed so that the electrode assembly can comprise areas with hydrogel that are partially or entirely surrounded by areas that do not have hydrogel. In some aspects, they hydrogel can cover less than 5%, or less than 10%, or less than 25%, or less than 50% of the surface area of the contact side 210 of the electrode 202.

Figure 4:
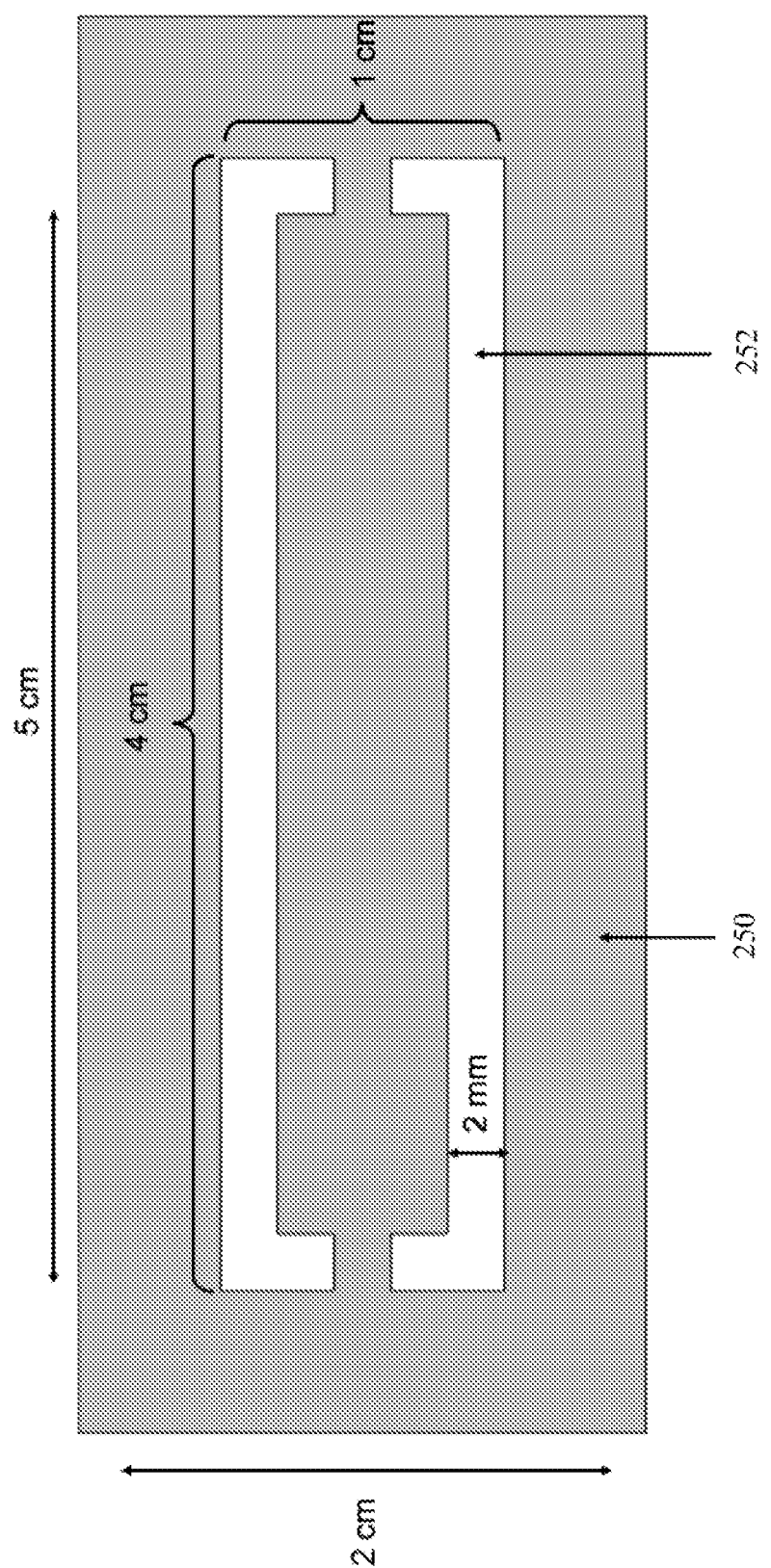
FIG. 4 illustrates a mask for depositing an exemplary hydrogel pattern as disclosed herein, including optional, exemplary dimensions that are not intended to limit the scope of the disclosure herein.

Referring also to FIG. 4, a mask 250 can be placed over the electrode 202 to control the distribution of the hydrogel. For example, the mask 250 can define cut-outs 252 so that when the mask is placed over the electrode 202, the hydrogel is deposited only at the cutouts 252. Although any suitable material can be used, the mask can optionally comprise one or more acrylic materials, as acrylic can be inexpensive and easy to machine. The exemplary mask 250 can be used with a 4 cm long by 1 cm wide electrode; however, it is contemplated that masks can be sized for use with an electrode of any size. Thus, for example, the mask 250 comprises cutouts 252 (e.g., two-millimeter wide cutouts) that extend the length of the electrode along the longitudinal edges and partially along the transverse edges of the electrode 202, except for a gap (e.g., optionally, a two-millimeter gap) at the center of each longitudinal end of the electrode. The mask 250 can be aligned with the electrode 202 so that the outer edges of the cutouts 252 of the mask meet the outer edges of the electrode 202. The mask 250 can provide a pattern on the electrode 202 that corresponds with the cutouts 252 of the mask 250. The deposition of the gel in this manner can enable the greatest contact surface area with the stratum corneum while maximizing the conductive pathways on the electrode.

In further aspects, instead of using a non-conductive hydrogel layer, it is contemplated that a conductive adhesive/hydrogel can be used. Optionally, the conductive hydrogel can coat all, or substantially all, of the surface of the electrode configured for contact with the skin of the patient. Such conductive adhesive/hydrogels can include SPECTRA gel-electrolyte (PARKER LABORATORIES) that can be applied over the electrode and interfaces with the stratum corneum, SIGNASPRAY electrode solution (PARKER LABORATORIES) that can be used to conduct for muscle stimulation equipment, and SIGNAGEL electrode gel (PARKER LABORATORES/PHYSIO CONTROL) that can be applied over the electrode and interfaces with the stratum corneum. Because of the conductivity, the conductive adhesive/hydrogel can cover the entire surface of the electrode. However, conventional conductive electrolyte adhesives dry out after a certain period and can usually only be worn for a certain duration (e.g. no more than a few days). Thus, although the conductive adhesive/hydrogels can improve electrical communication, their ability to dry out and cause skin irritation with the stratum corneum can hinder their long-term utility for bio-potential monitoring or healthcare applications which necessitate the use of electrode technology.

It should be understood that conventional electrode fabrication involves lithographic patterning and processing that is time consuming and complex, requiring expensive resources. In contrast, the disclosed methods can decrease the cost and time required to produce electrodes in a scalable quantity for various bioelectronics applications.

Exemplary Applications

Embodiments of the present disclosure (e.g., both the carbon black-PDMS electrodes and carbon-black-PVA electrodes) can be used in bioelectronic applications for, for example, monitoring and treating human health and performance. The disclosed electrodes can be integrated with a flexible electroceutical system for health maintenance and monitoring. Other potential applications include but are not limited to:

Integration with electrotherapeutic system for prevention of surgical site infections
Integration with electrotherapeutic system for treatment of acute wounds
Integration with electrotherapeutic system for treatment of chronic wounds
Integration with electrotherapeutic system for treatment of wound infection
Integration with electrotherapeutic system for pain management
Surface functional electrical stimulation of muscles
Remote patient activity monitoring
Ambulatory activity monitoring
Integration with ECG, EEG, EMG technology
Fluid flow monitoring, e.g. hydrocephalus
Iontophoresis/Reverse Iontophoresis
Drug Delivery
Biomarker extraction from eccrine or apocrine sweat
Strain gauges
Integration with stretchable electronics In some exemplary, non-limiting aspects, the flexible electrodes as disclosed herein can be used in devices for remotely monitoring and treating wound infections (e.g., using electrotherapy). The devices can be used in combination with various processing, monitoring, and/or treatment components to provide a system. Optionally, the disclosed device can be communicatively coupled to a remote computing device, such as a computer, a tablet, a smartphone, and the like. Optionally, such remote computing devices can include processing circuitry that is configured to execute application software that remotely controls and monitors operation of the device.

Figure 18:
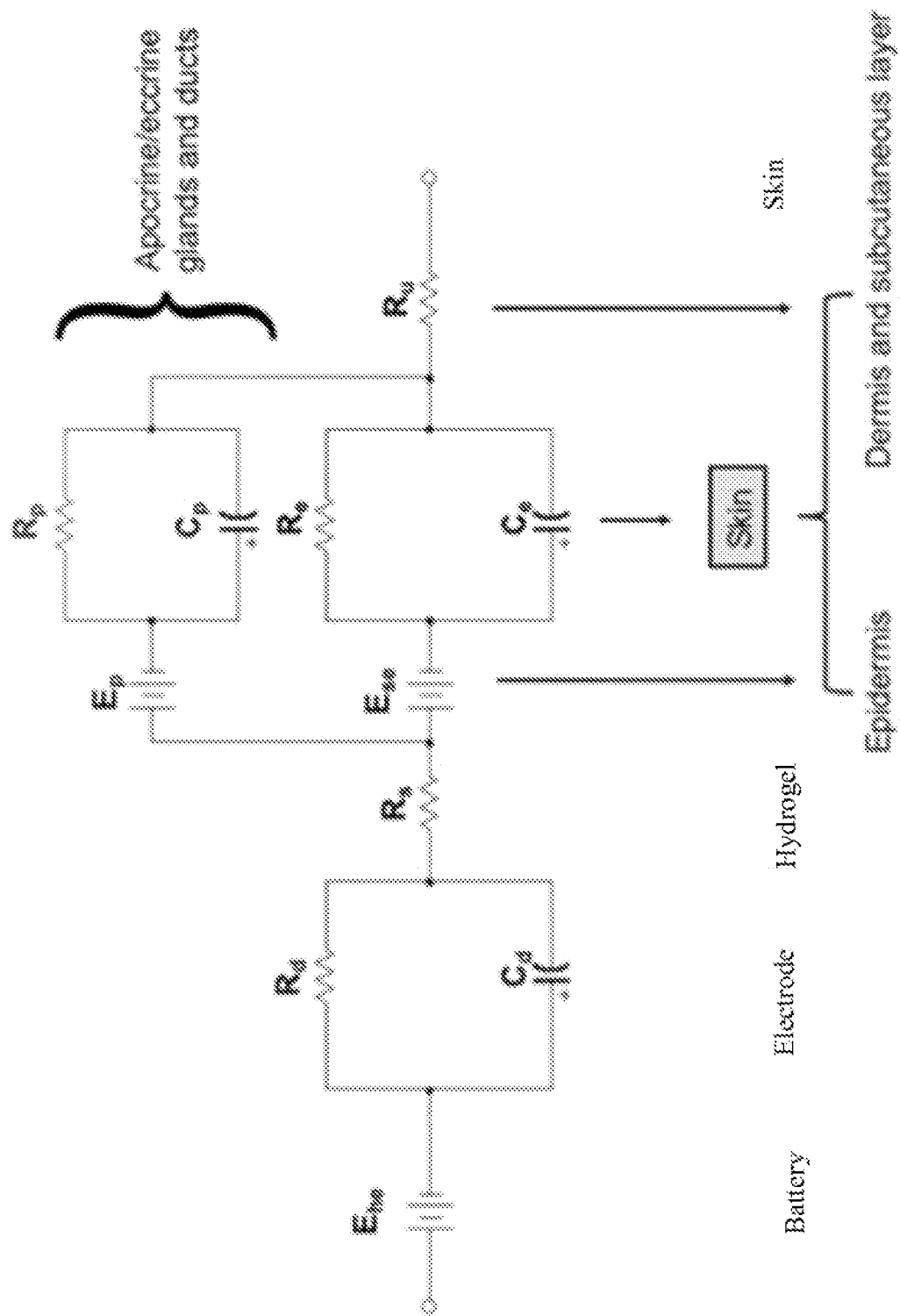
FIG. 18 illustrates an electrical diagram that models the electrical interactions between a device as disclosed herein and the skin of a subject.

FIG. 18 illustrates an electrical diagram that models the electrical interactions between a device as disclosed herein and the skin of a patient/subject that can be applicable when using the electrodes disclosed herein for wound monitoring and/or treatment.

Wound Treatment Device

Construction of the Pad

Figure 27:
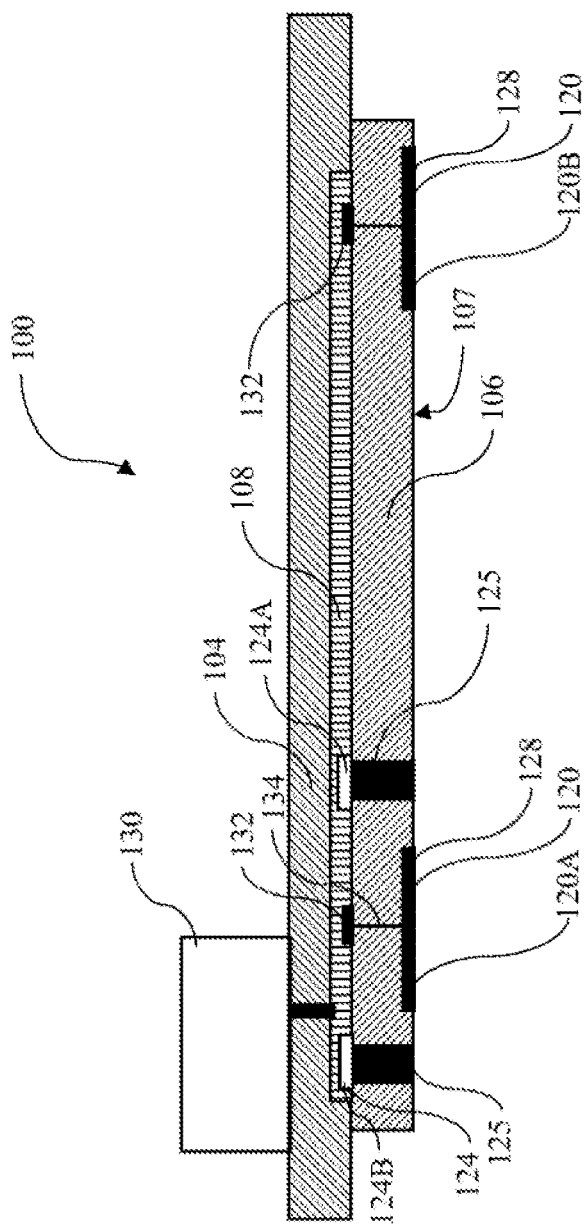
FIG. 27 shows a schematic cross-sectional diagram of a device as disclosed herein with exaggerated thickness proportions.

The wound treatment device can have a layered construction. A packaged stimulation/control module can be provided with the device 100 as shown in FIG. 27. In exemplary non-limiting aspects, the device can comprise: (1) an occlusive layer having circuitry therein for coupling to the stimulation/control module to temperature sensors and electrodes; (2) an absorbent material to manage wound exudate and support the stimulating electrodes and, optionally, one or more sensors (e.g., temperature sensors); (3) the stimulating electrodes and sensors; and (4) adhesive hydrogel to ensure contact with the wound and periwound area. More specifically, and in further optional aspects, an absorbent material (optionally, a transparent absorbent material) can be included as an intermediate layer in order to absorb wound exudate. A suitable absorbent material for this application can exhibit consistency in size and shape once soaked and not leak fluid once soaked. In some optional aspects, the electrodes (e.g., the electrodes used for stimulating and/or electrodes used for sensing) can be embodied as the flexible electrodes disclosed herein (e.g., the PDMS-carbon black electrodes and/or the PVA-carbon black electrodes). In further optional aspects, the electrodes can be constructed from conductive fabric. Optionally, in these aspects, it is contemplated that a suitable conductive fabric for this application can have low impedance, can maintain a stable voltage over the length of the electrode, will not heat when sustained current is applied, and can remain chemically stable when sterilized and when exposed to the wound environment. Examples of suitable conductive fabrics include SHIELDEX TECHNIK-TEX P130+B and SHIELDEX TECHNIK-TEX P130+B conductive fabrics sold by V Technical Textiles, Inc. of Palmyra, NY. In still further aspects, the electrodes can be attached to the power/control module using conductive thread, which can serve as a conductive via for vertical interconnects. Examples of a suitable conductive thread can include 235/43 DTEX HC+B conductive thread sold by V Technical Textiles, Inc. of Palmyra, NY. An appropriate adhesive can also be used to mechanically and electrically secure the electrodes. Optionally, the adhesive can be a conductive adhesive, such as a conductive epoxy adhesive. Suitable adhesives include MG Products 8331 silver conductive epoxy adhesive.

In some embodiments, the device 100 can comprise a top occlusion layer 104 and an absorbent layer 106. In various aspects, the top occlusion layer 104 can be reusable, and the absorbent layer 106 can be disposable. Accordingly, in some aspects, the absorbent layer 106 can be positioned over the wound, and the top occlusive layer 104 can be positioned over the absorbent layer.

The top occlusion layer 104 can optionally comprise a flexible, transparent window and a flexible adhesion portion that extends around the circumference of the transparent window and is configured to adhere to the skin of the patient/subject to enclose the absorbent layer 106 between the occlusion layer 104 and the patient. The transparent window can optionally comprise a flexible biocompatible polymeric material, such as SYLGARD polymer (manufactured by DOW), optionally, with moisture absorbent additives included therein. The flexible adhesion portion can serve to seal against the skin and prevent wound exudate from escaping. Optionally, the flexible adhesion portion and the transparent window can be provided as a single, integral structure. The absorbent layer 106 can optionally be transparent or partially transparent to provide, in cooperation with the transparent window of the top layer 104, visibility of the wound. The absorbent layer 106 can be resilient to puncture. The absorbent layer 106 can be configured to absorb moisture without changing physical characteristics.

A medical grade pressure sensitive adhesive coating can be disposed on the lower face of at least a portion of absorbent layer 106 for adhering the device 100 to the patient.

A plurality of electrodes 120 (optionally, a first electrode 120A and a second electrode 120B) can be disposed on an underside 107 (e.g., a wound side) of the absorbent layer 106. Optionally, an adhesive can be disposed on the underside 107 to help it adhere to the skin of the patient. Optionally, the absorbent layer 106 can define holes 122 therethrough, and the electrodes 120 can be positioned within the holes 122 and attached to the underside of the top layer 104. In further embodiments, the electrodes 120 can attach to the underside of the absorbent layer 106. In still further aspects, the electrodes 120 can be integral to the absorbent layer 106 and positioned on the wound of the absorbent layer. In use, it is contemplated that the electrodes 120 can be configured to provide electrical stimulation as further disclosed herein. The electrodes 120 can optionally be flexible nonmetallic electrodes (e.g., carbon black-PVA or carbon black-PDMS electrodes) as disclosed herein.

A plurality of temperature sensors 124 (optionally, a first temperature sensor 124A and a second temperature sensor 124B) can be configured to detect the temperature at the skin/wound of the patient. Optionally, the absorbent layer 106 can define holes 126 therethrough, and the temperature sensors 124 can be positioned within the holes 126 and attached to the underside of the top layer 104. In further embodiments, the temperature sensors 124 can attach to the underside of the absorbent layer 106. In still further aspects, the temperature sensors 124 can be spaced a small distance from the wound. For example, the temperature sensors 124 can be components of the top occlusive layer 104. A respective copper (or other thermally conductive material) contact pad 125 can be positioned against the skin of the patient and can interface between each of the temperature sensors 124 and the skin. Thermal diffusion from the skin can be relayed through the contact pads 125.

The electrodes 120 can be periwound electrodes. That is, in use, the electrodes 120 can be positioned on the skin surrounding the wound and, thus, be spaced (e.g., slightly spaced) from the wound bed (i.e., the area of the wound). The first temperature sensor 124A can be positioned between the electrodes 120, and the second temperature sensor 124B can be positioned outside of the electrodes 120. Thus, the first temperature sensor 124A can be positioned over or within the wound bed, while the second temperature sensor can be positioned away from (i.e., depending on the orientation of the wound and the device, laterally or vertically spaced from) the wound bed. For example, when the wound bed is oriented horizontally, it is contemplated that the second temperature sensor can be sufficiently horizontally spaced from the wound bed so that the temperature measured by the second temperature sensor reflects ambient/systemic temperature information (rather than the temperature at or within the wound). As shown in FIG. 27, the device 100 can have a longitudinal axis 105. Optionally, the first and second temperature sensors 124A, 124B and the first and second electrodes 120A, 120B can be aligned along the longitudinal axis 105. In some embodiments, along the longitudinal axis 105, the first temperature sensor 124A can be disposed between the first and second electrodes 120A, 120B, and the second temperature sensor 124B can be disposed outside of the space between the first and second electrodes 120A, 120B. Thus, when the electrodes are positioned on opposite sides of the wound bed, the first temperature sensor 124A can be positioned in the wound bed, and the second temperature sensor 124B can be positioned outside the wound bed (on the opposite side of the second electrode 120B from the first temperature sensor 124A). In some embodiments, the first and second temperature sensors 124A, 124B can be spaced from each other by at least 1.5 centimeters, at least two centimeters, or at least four centimeters (e.g., from about two centimeters to about three centimeters, from about three centimeters to about four centimeters, from about four centimeters to about five centimeters, from about five centimeters to about six centimeters, from about six centimeters to about seven centimeters, from about seven centimeters to about eight centimeters, from about eight centimeters to about nine centimeters, from about nine centimeters to about ten centimeters, from about ten centimeters to about twelve centimeters, or more. In some embodiments, the first and second electrodes 120A, 120B can be spaced from each other by at least two centimeters (e.g., from about two centimeters to about three centimeters, from about three centimeters to about four centimeters, from about four centimeters to about five centimeters, from about five centimeters to about six centimeters, from about six centimeters to about seven centimeters, from about seven centimeters to about eight centimeters, from about eight centimeters to about nine centimeters, from about nine centimeters to about ten centimeters, from about ten centimeters to about twelve centimeters, from about twelve centimeters to about fifteen centimeters, from about fifteen centimeters to about twenty centimeters, or from about twenty centimeters to about twenty-five centimeters or more. Optionally, it is contemplated that the spacing between the first and second electrodes 120A, 120B can be greater than the spacing between the first and second temperature sensors 124A, 124B. Alternatively, it is contemplated that the spacing between the first and second electrodes 120A, 120B can be equal or substantially equal to the spacing between the first and second temperature sensors 124A, 124B. In still a further alternative, it is contemplated that the spacing between the first and second electrodes 120A, 120B can be less than the spacing between the first and second temperature sensors 124A, 124B.

A layer of hydrogel 128 can cover the lower surfaces of the electrodes 120 and/or the temperature sensors 124. Optionally, the hydrogel 128 can be a conductive hydrogel as is known in the art and further described herein. Examples of hydrogels that can be used are disclosed in Staples, N. A., Goding, J. A., Gilmour, A. D., Aristovich, K. Y., Byrnes-Preston, P., Holder, D. S., . . . & Green, R. A. (2018). Conductive hydrogel electrodes for delivery of long-term high frequency pulses. Frontiers in neuroscience, 11, 748. The foregoing article is hereby incorporated by reference herein in its entirety. The conductive hydrogel can be a hybrid material comprising a conductive polymer and a hydrogel. In one exemplary aspect, a PEDOT/pTS prelayer can be electrodeposited from a solution of 100 mM 3,4-ethylenedioxythiophene (EDOT) and 50 mM sodium p-toluenesulfonate dissolved in 1:1 deionized (DI) water (Baxter Healthcare Pty Ltd.)-acetonitrile solution. The hydrogel macromer solution comprising 20 wt % poly(vinyl alcohol)-methacrylate-taurine (PVA-taurine) and 0.1 wt % Irgacure® 2959 (SIGMA ALDRICH) can be dissolved in deionized (DI) water. PVA-taurine can be synthesized. Next, the conductive hydrogel can be electrodeposited from a conductive polymer solution of 30 mM Ethylenedioxythiophene (e.g., provided by SIGMA ALDRICH) and 0.3 mM NaCl dissolved in DI water. In various further aspects, other hydrogels and conductive polymers can be combined to form a conductive hydrogel.

As shown schematically in FIG. 27, a control module 130 can be in electrical communication with the electrodes 120 and the temperature sensors 124. The control module 130 can electrically couple to the electrodes 120 and the temperature sensors 124 by flexible printed circuitry 108. The flexible printed circuitry 108 can define conductors that extend from the control module 130, along the top occlusive layer 104. Optionally, the conductors can comprise conductive traces (e.g., copper traces). However, it is contemplated that any conventional conductive material can be used. Optionally, the flexible printed circuitry 108 can be integrally formed with the top occlusive layer 104. In some optional aspects, the flexible printed circuitry 108 can comprise the temperature sensors 124. For example, the temperature sensors 124 can be integrally formed with the flexible printed circuitry or soldered thereto. The flexible printed circuitry 108 can define electrical contacts 132 that can form electrical communication with the electrodes 120. For example, Optionally, for example, a respective electrical conductor 134 can extend from the electrodes to an outer side (opposite the wound side) of the absorbent layer 106 where it engages the respective contact 132. The control module 130 can include a power source, such as a battery. In this way, the device 100 can be portable and can omit cables or wires extending therefrom. Alternatively, it is contemplated that the control module 130 can be electrically coupled to an external power source (for example, using a cord or cable).

In one aspect, the flexible printed circuitry 108 of the device can comprise a copper (Cu)-clad flex-electronics polyimide (or other suitable biocompatible) sheet. Photolithographic patterning can be used to fabricate Cu contact pads for coupling to the stimulation electrodes on the wound (bottom) side of the flexible printed circuitry 108 as well as interconnect traces for communicating electrical current to and from the electrodes and temperature sensors. The temperature sensors 124 can optionally be platinum temperature sensors (or any suitable material) and can optionally be fabricated using photolithography on the wound side of the absorbent pad 106. Via trenches for vertical interconnects between the two sides of the flexible printed circuitry 108 can be defined by laser micromachining and can be filled by Cu electroplating to define the vias. The electrodes 120 can optionally be multi-layered, multi-material electrodes. The layer of hydrogel 128 can provide a direct stimulation interface and can be laser micro-machined and attached to the electrodes on the wound-side of the absorbent pad 106.

The absorbent layer 106 can be placed over the wound with the electrodes and temperature sensors positioned as described herein. The occlusive layer 104 can be positioned over the absorbent layer 106 so that the control module 130 is in communication with the electrodes and temperature sensors. After use, the absorbent layer 106 can be removed from the wound and from the occlusive layer 104 and disposed of. In some aspects, the occlusive layer can be sterilized for reuse. In some optional aspects, the control module 130 can be removed prior to sterilization of the occlusive layer 106.

Temperature Sensing

The optimal wound bed temperature for healing can be 33° C. However, wound bed temperature can fluctuate greatly due to infection, ischemia or even simply due to dressing changes. For example, the wound bed can have a higher temperature than outside the wound if the wound is infected, and the wound bed can have a lower temperature than outside the wound if the wound is ischemic. Thus, biocompatible temperature sensors of appropriate range and sensitivity can be utilized. Temperature Coefficient of Resistance (TCR) is a material properties parameter used to relate the change in resistance with change of temperature. In exemplary aspects, the temperature sensors disclosed herein can measure a change in resistance that can be converted to a corresponding temperature change using conventional methods (for example, using TCR parameters).

Figure 28:
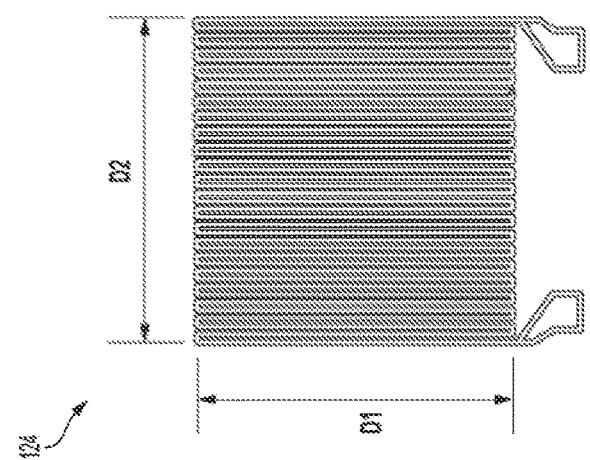
FIG. 28 shows an exemplary temperature sensor as disclosed herein.

In use, at least one temperature sensor can be located over the wound bed (i.e., the area of the wound), and at least one other temperature sensor can be located over intact periwound skin. The temperature sensor located over the periwound skin (i.e., spaced away from the wound area) can provide ambient/systemic temperature that can provide insight to the local wound microenvironment. The temperature sensors can be intentionally made with minimum sufficient surface area in contact with the wound or skin of the patient so as to minimize their impact on the electrical stimulation (ES) performance of the device. In exemplary aspects, it is contemplated that the actual "contact" surface area between each temperature sensor and the patient can range from about one square millimeter to about 200 square millimeters, from about 1.25 square millimeters to about 150 square millimeters, from about 1.5 square millimeters to about 100 square millimeters, from about 1.75 square millimeters to about 25 square millimeters, or from about two square millimeters to about five square millimeters. Thermal noise can be corrected by subtracting the periwound temperature measurement from the measurement from the sensor located over the wound bed. A temperature sensor can be created by inkjet printing conductive traces on a robust substrate or by other appropriate means of microfabrication. The substrate can be electrically insulating, chemically stable and biocompatible. Some optional materials for the substrate can include liquid crystal polymer, polyimide, parylene, polyethylene terephthalate (PET), polyethylene naphthalate (PEN). A schematic of an exemplary sensor can be seen in FIG. 28. The temperature sensor can have a rectangular or generally rectangular profile, having a length dimension D1 and a width dimension D2. Optionally, the length dimension D1 can be equal to the width dimension D2. Optionally, the length dimension D1 can be about sixteen millimeters, and the width dimension D2 can be about sixteen millimeters. However, it is contemplated that other suitable dimensions can be used. Optionally, both the traces and the spacing in between the traces are 0.2 mm thick. However, other spacing and trace thicknesses can be used. For example, as disclosed herein, it is contemplated that the traces can be structured to minimize the total area of contact between the traces and the patient. Thus, the actual contact area between the sensors and the patient (excluding void spaces corresponding to the spacing between the traces) can be significantly less than the total area covered by the sensors (as reflected by the total length dimension D1 and the total width dimension D2). Contact pads on the sensor electrodes can be connected to the power/control module by conducting vias, which can comprise holes or openings that extend through at least a portion of the thickness of the device as further disclosed herein. In use, the sensor can exhibit a linear response within the clinically relevant range of about 35° C. to about 40° C. (about 95° F. to about 104° F.). The temperature sensors can optionally provide accurate temperature measurements to within about 0.1° C. within the clinically relevant range. For example, the resistance across the temperature sensor can increase linearly with temperature increase within said range.

Impedance Sensing

It is contemplated that changes in wound impedance (i.e., the impedance across the wound) over time can be an indicator of progress of wound closure and healing. For example, an open wound can have an impedance of 1-5Ω, whereas healed human skin can have an impedance of at least an order of magnitude higher and, in some situations, about 10 kΩ. The impedance difference can be primarily due to the stratum corneum. As the wound heals, area impedance of the wound can increase, and an up-turn can occur as re-epithelialization occurs. Moreover, excess moisture in the wound bed due to exudate can substantially lower the impedance across the wound. Thus, measurement of the wound impedance can enable monitoring of both progress of the wound as well as excess moisture accumulation. The impedance between the electrodes can be measured in intervals between deliveries of therapeutic ES. In this way, a clinician can remotely monitor the status of the wound in real time without disturbing the wound environment.

Control Module

The control module 130 can control the current and/or voltage to the electrodes 120 for providing electrical stimulation. The controller can be operative to: control an electrical current between at least two electrodes of the plurality of electrodes to provide a series of electrical stimulations to a wound. Optionally, the series of electrical stimulations can be varied in accordance with a desired pattern or scheme. Further, the control module 130 can measure impedance between electrodes using conventional methods. Optionally, it is contemplated that the control module 130 can comprise or be in communication with an impedance meter as is known in the art. In use, the impedance meter, through the control module 130, can apply an AC voltage source across the wound. The impedance meter can receive signals from the electrodes that are indicative of the voltage across and the current through the wound. Using conventional techniques, the impedance meter can then determine the magnitude of the impedance based upon the ratio between the measured voltage and the measured current. In some embodiments, the control module 130 can comprise or be in communication with a display for displaying various information, including temperature measurements and impedance measurements.

In some embodiments, the control module 130 can be communicatively coupled (i.e., communicate using wired or wireless connection) to a remote device 150. In some embodiments, the remote device 150 can be a remote monitor. In further embodiments, the remote device 150 can perform certain control and/or processing functions. For example, the control module 130 can receive signals from the temperature sensors 124 (e.g., signals indicative of resistance measurements by the sensors as further disclosed herein). In some embodiments, the control module 130 can process said signals for conversion to a temperature measurement (e.g, using TCR parameters). In these embodiments, it is contemplated that the control module can comprise at least one processor and a memory that stores instructions that, when executed by the at least one processor, determine the temperature measurement based on the received signals. In further embodiments, the remote device 150 can receive and process said signals for conversion to a temperature measurement. Similarly, the remote device 150 can display various information, including temperature measurements and impedance measurements. Further, the remote device 150 can provide an interface through which a clinician can control the device 100 (e.g., begin or end the electrical stimulation as well as change the properties of the electrical stimulation).

Optionally, in exemplary aspects, the remote device 150 can be provided as a remote computing device, such as, for example and without limitation, a smartphone, a tablet, a laptop computer, or a desktop computer. In these aspects, it is further contemplated that the remote device 150 can comprise at least one processor and a memory in communication with the processor. The memory can store instructions that, when executed by the processor, determine information concerning the wound of the patient, including the temperature measurement, impedance measurements, change in temperature, and change in impedance. The memory can further store additional information related to device use as well as battery status. The control module 130 can be configured for internet connectivity, optionally, through the remote device 150. In this way, data from the control module 130 can be uploaded to a remote server. Thus, a clinician can remotely monitor the status of the wound. Further, in some optional aspects, the control module 130 can receive instructions from the internet or closed network, for example, to modify the electrotherapy.

In exemplary aspects, it is contemplated that the control module 130 and the remote device 150 (when provided) can comprise respective user interfaces (e.g., keyboards, touchscreens, dials, and the like) that allow for direct communication between a clinician and the control module and remote module. In use, it is contemplated that the control module 130 and/or the remote device 150 can be configured to control and adjust the duration, intensity/voltage, and/or frequency of the electrical stimulation that is delivered through the electrodes as disclosed herein.

Optionally, the control module 130 or the remote device 150 can be configured to determine an ischemic status of the wound based on a temperature difference between the first temperature sensor 124A and the second temperature sensor 124B. Optionally, the control module 130 or the remote device 150 can be configured to determine a healing status based on changes in impedance between the first and second electrodes 120A,B.

Kit

A kit can comprise a plurality of devices 100. The devices in the kit can be of varying sizes. Each device 100 of the kit can be configured for a respective (optionally, different) size or shape of wound. Thus, it is contemplated that each device 100 of the kit can differ in at least one (optionally, a plurality) of the following parameters from at least one other device (optionally, each other device) of the kit: spacing between electrodes; spacing between temperature sensors; length or width of the absorbent layer 106; electrical stimulation parameters; length or width of the temperature sensors; or length or width of the electrodes. For example, a first device in the kit can be configured to treat a two inch by two inch wound. The absorbent layer 106 can therefore be substantially larger than two inches by two inches. The first and second electrodes 120A, 120B can be spaced greater than two inches, with the first temperature sensor being positioned between the two electrodes and the second electrode being positioned between the first and second temperature sensors (so that the second temperature sensor will be outside the wound area). A second device can be configured to treat a three inch by four inch wound. The absorbent layer 106 can therefore be substantially larger than three inches by four inches. The first and second electrodes 120A, 120B can be spaced greater than three inches.

Computing Device

Figure 29:
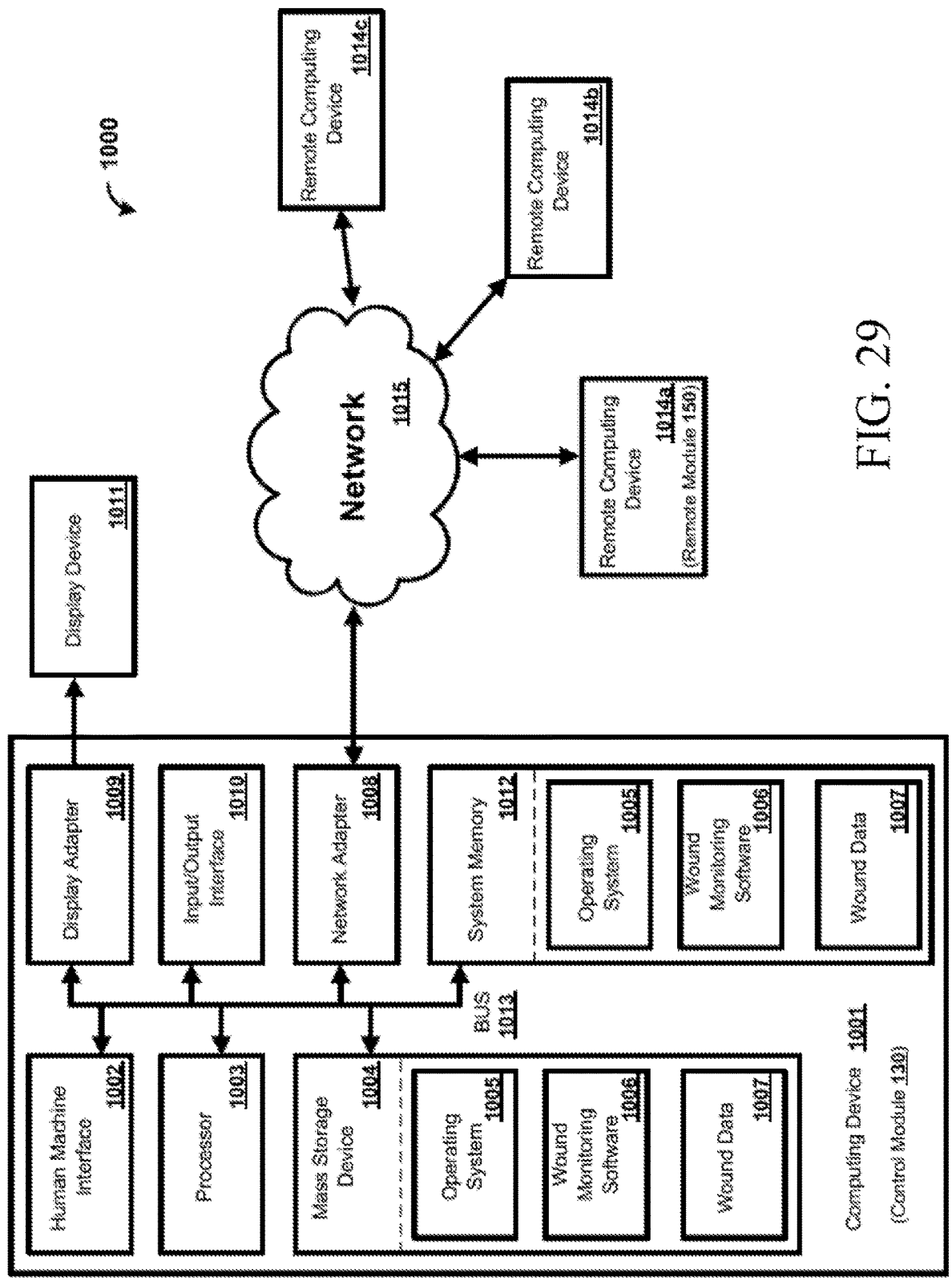
FIG. 29 shows an exemplary computing system comprising a computing device as disclosed herein.

FIG. 29 shows a system 1000 including an exemplary configuration of a control module 130 for use with the device 100. As shown, the control module 130 can be provided as a computing device 1001, while the remote module 150 (when provided) can be provided as a remote computing device. For example, the computing device 1001 can perform various aspects of monitoring the temperature and impedance readings from the device 100. Moreover, the computing device 1001 can control some or all aspects of electrical stimulation treatment.

The computing device 1001 may comprise one or more processors 1003, a system memory 1012, and a bus 1013 that couples various components of the computing device 1001 including the one or more processors 1003 to the system memory 1012. In the case of multiple processors 1003, the computing device 1001 may utilize parallel computing.

The bus 1013 may comprise one or more of several possible types of bus structures, such as a memory bus, memory controller, a peripheral bus, an accelerated graphics port, and a processor or local bus using any of a variety of bus architectures.

The computing device 1001 may operate on and/or comprise a variety of computer readable media (e.g., non-transitory). Computer readable media may be any available media that is accessible by the computing device 1001 and comprises, non-transitory, volatile and/or non-volatile media, removable and non-removable media. The system memory 1012 has computer readable media in the form of volatile memory, such as random access memory (RAM), and/or non-volatile memory, such as read only memory (ROM). The system memory 1012 may store data such as wound data 1007 and/or program modules such as operating system 1005 and wound monitoring software 1006 that are accessible to and/or are operated on by the one or more processors 1003.

The computing device 1001 may also comprise other removable/non-removable, volatile/non-volatile computer storage media. The mass storage device 1004 may provide non-volatile storage of computer code, computer readable instructions, data structures, program modules, and other data for the computing device 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1004. An operating system 1005 and wound monitoring software 1006 may be stored on the mass storage device 1004. One or more of the operating system 1005 and wound monitoring software 1006 (or some combination thereof) may comprise program modules and the wound monitoring software 1006. Wound data 1007 may also be stored on the mass storage device 1004. Wound data 1007 may be stored in any of one or more databases known in the art. The databases may be centralized or distributed across multiple locations within the network 1015.

A user (e.g., the clinician) may enter commands and information into the computing device 1001 using an input device (not shown). Such input devices comprise, but are not limited to, a touchscreen (e.g., a touchscreen of a smartphone or tablet), a keyboard, a pointing device (e.g., a computer mouse, remote control), a microphone, a joystick, a scanner, tactile input devices such as gloves, and other body coverings, a motion sensor, a voice recognition device, and the like. These and other input devices may be connected to the one or more processors 1003 using a human machine interface 1002 that is coupled to the bus 1013, but may be connected by other interface and bus structures, such as a parallel port, game port, an IEEE 1394 Port (also known as a Firewire port), a serial port, network adapter 1008, and/or a universal serial bus (USB).

A display device 1011 may also be connected to the bus 1013 using an interface, such as a display adapter 1009. It is contemplated that the computing device 1001 may have more than one display adapter 1009 and the computing device 1001 may have more than one display device 1011. A display device 1011 may be a monitor, an LCD (Liquid Crystal Display), light emitting diode (LED) display, television, smart lens, smart glass, and/or a projector. In addition to the display device 1011, other output peripheral devices may comprise components such as speakers (not shown) and a printer (not shown) which may be connected to the computing device 1001 using Input/Output Interface 1010. Any step and/or result of the methods may be output (or caused to be output) in any form to an output device. Such output may be any form of visual representation, including, but not limited to, textual, graphical, animation, audio, tactile, and the like. The display 1011 and computing device 1001 may be part of one device, or separate devices.

The computing device 1001 may operate in a networked environment using logical connections to one or more remote computing devices 1014*a,b,c*. A remote computing device 1014*a,b,c* may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computing device 1001 and a remote computing device 1014a,b,c may be made using a network 1015, such as a local area network (LAN) and/or a general wide area network (WAN). Such network connections may be through a network adapter 1008. A network adapter 1008 may be implemented in both wired and wireless environments. Such networking environments are conventional and commonplace in dwellings, offices, enterprise-wide computer networks, intranets, and the Internet. It is contemplated that the remote computing devices 1014a,b,c can optionally have some or all of the components disclosed as being part of computing device 1001.

Application programs and other executable program components such as the operating system 1005 are shown herein as discrete blocks, although it is recognized that such programs and components may reside at various times in different storage components of the computing device 1001, and are executed by the one or more processors 1003 of the computing device 1001. An implementation of wound monitoring software 1006 may be stored on or sent across some form of computer readable media. Any of the disclosed methods may be performed by processor-executable instructions embodied on computer readable media.

Exemplary Aspects

In view of the described device, systems, and methods and variations thereof, herein below are certain more particularly described aspects of the invention. These particularly recited aspects should not, however, be interpreted to have any limiting effect on any different claims containing different or more general teachings described herein, or that the "particular" aspects are somehow limited in some way other than the inherent meanings of the language literally used therein.

Aspect 1: An electrode comprising: carbon black and a polymer, wherein the polymer is one of PDMS or PVA, wherein the carbon black is provided at a weight of between 10% and 50% of a weight of the polymer.

Aspect 2: The electrode of aspect 1, wherein the polymer is PDMS, wherein the weight of the carbon black is between 10% and 30% of the weight of the polymer.

Aspect 3: The electrode of aspect 2, wherein the weight of the carbon black is between 10% and 25% of the weight of the polymer.

Aspect 4: The electrode of aspect 3, wherein the weight of the carbon black is between 15% and 25% of the weight of the polymer.

Aspect 5: The electrode of aspect 4, wherein the weight of the carbon black is about 25% of the weight of the polymer.

Aspect 6: The electrode of any one of the preceding aspects, wherein the electrode has a resistivity of less than 15 Ω-m.

Aspect 7: The electrode of aspect 1, wherein the polymer is PVA.

Aspect 8: The electrode of aspect 7, wherein the weight of the carbon black is between 10% and 60% of the weight of the polymer.

Aspect 9: The electrode of aspect 8, wherein the weight of the carbon black is about 50% of the weight of the polymer.

Aspect 10: A method of making an electrode comprising: depositing a mixture of carbon black, a polymer, and solvent in a mold, wherein the polymer is one of PVA or PDMS, wherein a weight of the carbon black is between 10% and 50% of a weight of the polymer.

Aspect 11: The method of aspect 10, wherein the polymer is PDMS, the method further comprising: mixing a first mixture comprising a PDMS base, a PDMS curing agent, and solvent; mixing a second mixture comprising carbon black and solvent; and mixing the first mixture with the second mixture to provide the mixture of carbon black, PDMS, and solvent.

Aspect 12: The method of aspect 11, wherein mixing the second mixture comprising carbon black and solvent comprises using a sonicator.

Aspect 13: The method of aspect 10, further comprising: thermally curing the mixture within the mold.

Aspect 14: The method of any one of aspects 10-13, wherein the solvent comprises toluene.

Aspect 15: The method of aspect 10, wherein the polymer is PVA, the method further comprising: mixing a first mixture comprising PVA, solvent, and glycerol; mixing a second mixture comprising carbon black and solvent; and mixing the first mixture with the second mixture to provide the mixture of carbon black, PDMS, and solvent.

Aspect 16: The method of aspect 15, wherein the solvent comprises water.

Aspect 17: The method of any one of aspects 10-15, further comprising: after allowing the mixture to cure to form an electrode having a first side and a second side, depositing a layer of hydrogel over at least a portion of the first side of the electrode.

Aspect 18: The method of aspect 17, where depositing the layer of hydrogel over at least a portion of the first side of the electrode comprises depositing the layer of hydrogel over substantially an entirety of the first side of the electrode, wherein the hydrogel is a conductive hydrogel.

Aspect 19: The method of aspect 17, where depositing the layer of hydrogel over at least a portion of the first side of the electrode comprises depositing the layer of hydrogel over only a portion of the first side of the electrode.

Aspect 20: The method of aspect 19, wherein depositing the layer of hydrogel over only the portion of the first side of the electrode comprises placing a mask over the surface of the electrode, wherein the mask comprises at least one cut-out that defines a coverage area where hydrogel is deposited.

Aspect 21: A device comprising: an absorbent layer having a wound side and an opposed outer side; a plurality of electrodes disposed over the wound side of the absorbent layer, wherein each electrode of the plurality of electrodes is an electrode of one of aspects 1-9; an occlusive layer positioned against the outer side of the absorbent layer, wherein the occlusive layer comprises flexible circuitry that defines a plurality of electrical contacts, a plurality of temperature sensors coupled to the flexible circuitry; wherein each electrode of the plurality of electrodes is in electrical communication with a respective contact of the plurality of contacts of the flexible circuitry.

Aspect 22: The device of aspect 21, further comprising: a controller in electrical communication with the plurality of electrodes and the plurality of temperature sensors, wherein the controller is operative to: control an electrical current between at least two electrodes of the plurality of electrodes to provide a series of electrical stimulations to a wound, and receive a signal from each temperature sensor of the plurality of temperature sensors.

Aspect 23: The device of aspect 22, wherein the plurality of electrodes comprises at least a first electrode and a second electrode, wherein the controller is further operative to: receive an impedance measurement from between the first electrode and the second electrode; and transmit, to a remote device, a signal corresponding to the impedance measurement.

Aspect 24: The device of any one of aspects 21-23, wherein at least a portion of the absorbent layer is transparent, resilient to puncture, and configured to absorb moisture without changing physical characteristics.

Aspect 25: The device of any one of aspects 21-24, wherein a first temperature sensor of the plurality of temperature sensors is configured for positioning within an area of a wound and a second temperature sensor is spaced from the first temperature sensor by at least two centimeters along a longitudinal axis of the device.

Aspect 26: The device of aspect 25, wherein the device has a longitudinal axis, wherein the plurality of electrodes comprises a first electrode and a second electrode, wherein the first and second electrodes and the first and second temperature sensors are aligned along the longitudinal axis, wherein the first temperature sensor is positioned in a space between the first and second electrodes, and wherein the second temperature sensor is positioned outside of the space between the first and second electrodes.

Aspect 27: The device of aspect 26, wherein the first temperature sensor is spaced from the second temperature sensor by at least two centimeters.

Aspect 28: The device of any one of aspects 21-27, wherein at least a portion of the occlusive layer is at least partially transparent.

Aspect 29: The device of any one of aspects 21-28, wherein the occlusive layer comprises a polyimide layer comprising photolithographic patterning that defines copper traces.

Aspect 30: The device of any one of aspects 21-29, wherein the temperature sensors are fabricated via photolithography.

Aspect 31: The device of any one of aspects 21-30, wherein the plurality of temperature sensors are configured to exhibit a linear response within a range between 35° C. and 40° C., wherein the plurality of temperature sensors have sensitivity of +/−0.1° C. or less.

Aspect 32: The device of any one of aspects 22-31, wherein the controller is further operative to transmit, to a remote device, a signal corresponding to the signal from each temperature sensor.

Aspect 33: The device of any one of aspects 22-32, wherein the controller is further operative to transmit, to a remote device, a signal corresponding to battery charge status Aspect 34: The device of any one of aspects 22-33, wherein the controller is further operative to transmit, to a remote device, a signal corresponding to device activation status Aspect 34: A method comprising: positioning a device as in any one of aspects 21-33 on a patient so that a first temperature sensor of the first plurality of temperature sensors is positioned within an area of a wound and a second temperature sensor of the plurality of temperature sensors is positioned at a location spaced from the area of the wound.

Aspect 35: The method of aspect 34, further comprising: determining an infection status of the wound based on a temperature difference between the first temperature sensor and the second temperature sensor.

Aspect 36: The method of aspect 34, further comprising: determining the ischemic status of the wound based on a temperature difference between the first temperature sensor and the second temperature sensor.

Aspect 37: The method of aspect 34, wherein the device is positioned on the patient so that the plurality of electrodes are positioned at respective locations spaced from the area of the wound.

Aspect 38: The method of aspect 34, wherein a distance by which the second temperature sensor is spaced from the area of the wound is greater than respective distances by which the plurality of electrodes are spaced from the area of the wound.

Aspect 39: An electrode assembly comprising: an electrode as in any one of aspect 1-9, wherein the electrode has a contact side and an opposing side; and a layer of hydrogel disposed on the contact side of the electrode.

Aspect 40: The electrode assembly of aspect 39, wherein the layer of hydrogel is disposed on the contact side of the electrode in a pattern so that at least a portion of the contact side of the electrode does not have hydrogel thereon.

Aspect 41: The electrode assembly of aspect 40, wherein the pattern comprises a plurality of areas that have hydrogel and at least one area that does not have hydrogel.

Aspect 42: The electrode assembly as in aspect 41, wherein the pattern comprises respective areas that have hydrogel that are separated by at least one of the at least one area that does not have hydrogel.

Aspect 43: The electrode assembly as in any one of aspects 39-42, wherein the electrode has a first longitudinal side and an opposing longitudinal side, wherein the hydrogel comprises at least a first portion that extends along the first longitudinal side and a second portion that extend along the second longitudinal side.

Aspect 44: The electrode assembly as in any one of aspects 39-43, further comprising an adhesive patch.

Aspect 45: The electrode assembly as in any one of aspects 39-44, further comprising circuitry in communication with the electrode, wherein the circuitry is configured to receive and store signals from the electrode.

Those skilled in the art will recognize, or be able to ascertain using no more than routine experimentation, many equivalents to the specific embodiments of the method and compositions described herein. Such equivalents are intended to be encompassed by the following claims.

What is claimed is:

1. A device comprising:
  an absorbent layer having an inner side and an opposed outer side;
  a plurality of electrodes disposed over the inner side of the absorbent layer, wherein each electrode of the plurality of electrodes comprises carbon black and a polymer, wherein the polymer is one of polydimethylsiloxane (PDMS) or polyvinyl alcohol (PVA), wherein the carbon black is provided at a weight of between 10% and 50% of a weight of the polymer;
  an occlusive layer positioned against the outer side of the absorbent layer, wherein the occlusive layer comprises flexible circuitry that defines a plurality of electrical contacts,
  a plurality of temperature sensors coupled to the flexible circuitry;
  wherein each electrode of the plurality of electrodes is in electrical communication with a respective contact of the plurality of contacts of the flexible circuitry.

2. The device of claim 1, further comprising:
  a controller in electrical communication with the plurality of electrodes and the plurality of temperature sensors, wherein the controller is operative to:
    control an electrical current between at least two electrodes of the plurality of electrodes to provide a series of electrical stimulations to a wound, and
    receive a signal from each temperature sensor of the plurality of temperature sensors.

3. The device of claim 2, wherein the plurality of electrodes comprises at least a first electrode and a second electrode, wherein the controller is further operative to:

receive an impedance measurement from between the first electrode and the second electrode; and transmit, to a remote device, a signal corresponding to the impedance measurement.

4. The device of claim 1, wherein the polymer is PDMS, wherein the weight of the carbon black is between 10% and 30% of the weight of the PDMS.

5. The device of claim 4, wherein the weight of the carbon black is between 10% and 25% of the weight of the PDMS.

6. The device of claim 5, wherein the weight of the carbon black is between 15% and 25% of the weight of the PDMS.

7. The device of claim 1, wherein each electrode of the plurality of electrodes has a resistivity of less than 15 $\Omega$-m.

8. The device of claim 1, wherein the polymer is PVA.

9. The device of claim 8, wherein the weight of the carbon black is between 40% and 50% of the weight of the PVA.

10. The device of claim 9, wherein each electrode of the plurality of electrodes consists of the carbon black and the PVA.

11. An electrode assembly comprising:

an electrode, wherein the electrode has a contact side and an opposing side, wherein the electrode comprises carbon black and a polymer, wherein the polymer is one of polydimethylsiloxane (PDMS) or polyvinyl alcohol (PVA), wherein the carbon black is provided at a weight of between 10% and 50% of a weight of the polymer; and a layer of hydrogel disposed on the contact side of the electrode, wherein the layer of hydrogel is disposed on the contact side of the electrode in a pattern so that at least a portion of the contact side of the electrode does not have hydrogel thereon.

12. The electrode assembly of claim 11, wherein the polymer is PDMS, wherein the weight of the carbon black is between 10% and 30% of the weight of the PDMS.

13. The electrode assembly of claim 12, wherein the weight of the carbon black is between 10% and 25% of the weight of the PDMS.

14. The electrode assembly of claim 13, wherein the weight of the carbon black is between 15% and 25% of the weight of the PDMS.

15. The electrode assembly of claim 11, wherein the electrode has a resistivity of less than 15 $\Omega$-m.

16. The electrode assembly of claim 11, wherein the polymer is PVA.

17. The electrode assembly of claim 16, wherein the weight of the carbon black is between 40% and 50% of the weight of the PVA.

18. The electrode assembly of claim 17, wherein the electrode consists of the carbon black and the PVA.

\* \* \* \* \*